(12) United States Patent
Imai et al.

(10) Patent No.: US 10,578,047 B2
(45) Date of Patent: Mar. 3, 2020

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota-shi, Aichi-ken (JP)

(72) Inventors: Sohichi Imai, Toyota (JP); Masanao Idogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/160,591

(22) Filed: Oct. 15, 2018

(65) Prior Publication Data

US 2019/0120168 A1    Apr. 25, 2019

(30) Foreign Application Priority Data

Oct. 25, 2017 (JP) .................. 2017-206306

(51) Int. Cl.
    *F02D 41/40*   (2006.01)
    *F02D 41/14*   (2006.01)
    *F02D 41/00*   (2006.01)

(52) U.S. Cl.
    CPC ....... *F02D 41/402* (2013.01); *F02D 41/0082* (2013.01); *F02D 41/1443* (2013.01); *F02D 41/0085* (2013.01)

(58) Field of Classification Search
    USPC ........... 123/295–305, 478–481, 525–527, 123/575–577; 701/101–105, 115
    See application file for complete search history.

(56) References Cited

U.S. PATENT DOCUMENTS

| | | | |
|---|---|---|---|
| 7,213,574 B2* | 5/2007 | Nishimura | F02D 41/022 123/431 |
| 7,729,845 B2* | 6/2010 | Iwashita | F02D 41/403 123/299 |

(Continued)

FOREIGN PATENT DOCUMENTS

| | | |
|---|---|---|
| JP | 2003-343331 A | 3/2003 |
| JP | 2008-215231 A | 9/2008 |

(Continued)

OTHER PUBLICATIONS

Japanese Patent Application No. 2016-501251 filed on May 6, 2016.

*Primary Examiner* — John Kwon
*Assistant Examiner* — Johnny H Hoang
(74) *Attorney, Agent, or Firm* — Oliff PLC

(57) ABSTRACT

A controller for controlling an internal combustion engine includes an injection amount calculation portion that calculates a base injection amount, an injection amount correction portion that corrects the base injection amount to calculate first and second corrected injection amounts, and an injection count determination portion that determines first and second fuel injection counts, which are respectively a number of times fuel is injected from first and second fuel injection valves. When the first and second corrected injection amounts are respectively calculated using the same base injection amount, the injection count determination portion sets the first fuel injection count corresponding to the first corrected injection amount to be equal to the second fuel injection count corresponding to the second corrected injection amount.

7 Claims, 7 Drawing Sheets

(56) References Cited

U.S. PATENT DOCUMENTS

| | | | |
|---|---|---|---|
| 2003/0217734 A1 | 11/2003 | Ito et al. | |
| 2005/0172933 A1* | 8/2005 | Takeuchi | F02D 41/10 123/339.19 |
| 2010/0108025 A1 | 5/2010 | Yuzaki et al. | |
| 2014/0238346 A1* | 8/2014 | Sakamoto | F02D 41/18 123/403 |

FOREIGN PATENT DOCUMENTS

| | | |
|---|---|---|
| JP | 2012-013054 A | 1/2012 |
| JP | 2013-209937 A | 10/2013 |
| JP | 2013-213509 A | 10/2013 |
| JP | 2013-234673 A | 11/2013 |
| JP | 2014-227964 A | 12/2014 |

* cited by examiner

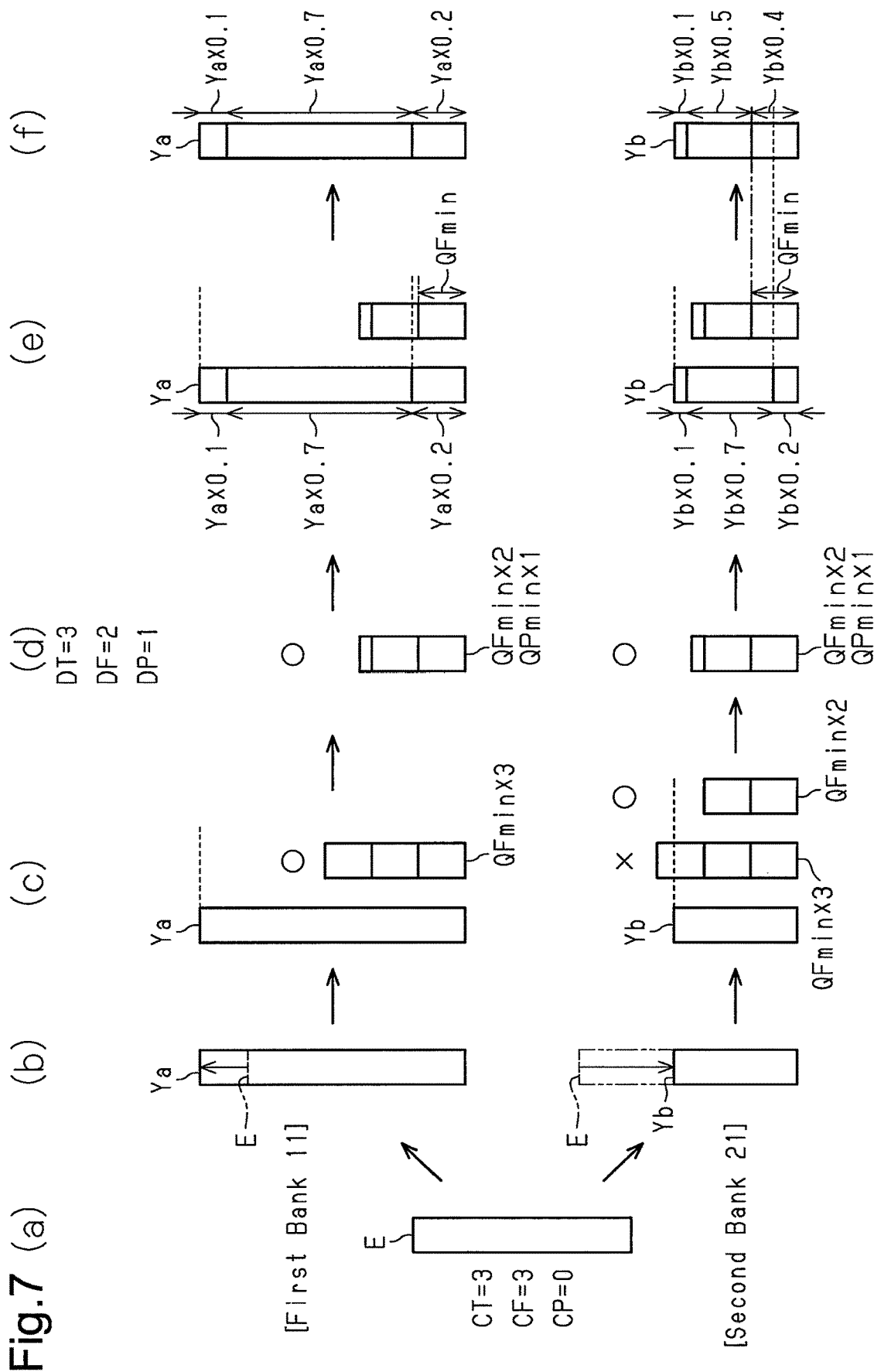

CONTROLLER FOR INTERNAL COMBUSTION ENGINE AND METHOD FOR CONTROLLING INTERNAL COMBUSTION ENGINE

BACKGROUND

The present invention relates to a controller for an internal combustion engine and a method for controlling an internal combustion engine.

Japanese Laid-Open Patent Publication No. 2013-234673 discloses a V-type eight-cylinder internal combustion engine. The internal combustion engine includes a first bank that has four cylinders configured to be a first cylinder group and a second bank that has four cylinders configured to be a second cylinder group. Each cylinder of the first bank is supplied with fuel from a first fuel injection valve that corresponds thereto. Each cylinder of the second bank is supplied with fuel from a second fuel injection valve that corresponds thereto. Additionally, the air-fuel ratio of exhaust gases discharged from the four cylinders of the first bank is detected by a first air-fuel ratio sensor. The air-fuel ratio of exhaust gases discharged from the four cylinders of the second bank is detected by a second air-fuel ratio sensor.

Fuel injections from the first fuel injection valve and from the second fuel injection valve are controlled by a controller. The controller calculates a fuel injection amount required during one combustion cycle in accordance with a running state of the internal combustion engine. Additionally, the controller determines the number of times that fuel is injected during one combustion cycle in accordance with the running state of the internal combustion engine and the calculated fuel injection amount.

SUMMARY

The fuel injection amount described above may be corrected based on the air-fuel ratio detected by the first air-fuel ratio sensor to calculate a first corrected injection amount, which is an amount of fuel injected from the first fuel injection valve. Also, the fuel injection amount described above may be corrected based on the air-fuel ratio detected by the second air-fuel ratio sensor to calculate a second corrected injection amount, which is an amount of fuel injected from the second fuel injection valve.

However, when the first corrected injection amount and the second corrected injection amount are individually calculated, the first corrected injection amount may differ from the second corrected injection amount. In this case, the number of times that fuel is injected into each cylinder of the first cylinder group during one combustion cycle may differ from the number of times that fuel is injected into each cylinder of the second cylinder group during one combustion cycle. Such a difference in the number of times fuel is injected may unbalance the combustion state between the cylinder groups and cause, for example, vibration and noise.

One aspect of the present invention is a controller for an internal combustion engine. The internal combustion engine includes a first cylinder group including two or more cylinders, a first fuel injection valve configured to supply fuel to the cylinders of the first cylinder group, a second cylinder group including two or more cylinders that are different from the cylinders of the first cylinder group, and a second fuel injection valve configured to supply fuel to the cylinders of the second cylinder group, and the internal combustion engine allows divided injection in which an amount of fuel required during one combustion cycle is supplied to each cylinder through multiple injections. The controller includes an injection amount calculation portion, an injection amount correction portion, and an injection count determination portion. The injection amount calculation portion is configured to calculate a base injection amount, the base injection amount being a base amount of fuel required during one combustion cycle, in accordance with a running state of the internal combustion engine. The injection amount correction portion is configured to correct the base injection amount based on at least one of an intake state and an exhaust state of the first cylinder group to calculate a first corrected injection amount, the first corrected injection amount being an amount of fuel injected from the first fuel injection valve, and configured to correct the base injection amount based on at least one of an intake state and an exhaust state of the second cylinder group to calculate a second corrected injection amount, the second corrected injection amount being an amount of fuel injected from the second fuel injection valve. The injection count determination portion is configured to determine a first fuel injection count, the first fuel injection count being a number of times that fuel is injected from the first fuel injection valve during one combustion cycle, and a second fuel injection count, the second fuel injection count being a number of times that fuel is injected from the second fuel injection valve during one combustion cycle. When the first corrected injection amount and the second corrected injection amount are calculated using the same base injection amount, the injection count determination portion is configured to set the first fuel injection count corresponding to the first corrected injection amount to be equal to the second fuel injection count corresponding to the second corrected injection amount.

One aspect of the present invention is a method for controlling an internal combustion engine. The internal combustion engine includes a first cylinder group including two or more cylinders, a first fuel injection valve configured to supply fuel to the cylinders of the first cylinder group, a second cylinder group including two or more cylinders that are different from the cylinders of the first cylinder group, and a second fuel injection valve configured to supply fuel to the cylinders of the second cylinder group, and the internal combustion engine allows divided injection in which an amount of fuel required during one combustion cycle is supplied to each cylinder through multiple injections. The method includes calculating a base injection amount, the base injection amount being a base amount of fuel required during one combustion cycle, in accordance with a running state of the internal combustion engine; correcting the base injection amount based on at least one of an intake state and an exhaust state of the first cylinder group to calculate a first corrected injection amount, the first corrected injection amount being an amount of fuel injected from the first fuel injection valve, and correcting the base injection amount based on at least one of an intake state and an exhaust state of the second cylinder group to calculate a second corrected injection amount, the second corrected injection amount being an amount of fuel injected from the second fuel injection valve; and determining a first fuel injection count, the first fuel injection count being a number of times that fuel is injected from the first fuel injection valve during one combustion cycle, and a second fuel injection count, the second fuel injection count being a number of times that fuel is injected from the second fuel injection valve during one combustion cycle. When the first corrected injection amount and the second corrected injection amount are calculated using the same base injection amount, the first fuel injection count corresponding to the first corrected injection amount is set to be equal to the second fuel injection count corresponding to the second corrected injection amount.

One aspect of the present invention a controller for controlling an internal combustion engine. The internal combustion engine includes a first cylinder group including two or more cylinders, a first fuel injection valve configured to supply fuel to the cylinders of the first cylinder group, a second cylinder group including two or more cylinders that are different from the cylinders of the first cylinder group, and a second fuel injection valve configured to supply fuel to the cylinders of the second cylinder group, and the internal combustion engine allows divided injection in which an amount of fuel required during one combustion cycle is supplied to each cylinder through multiple injections, the controller comprising circuitry. The circuitry is configured to execute calculating a base injection amount, the base injection amount being a base amount of fuel required during one combustion cycle, in accordance with a running state of the internal combustion engine; correcting the base injection amount based on at least one of an intake state and an exhaust state of the first cylinder group to calculate a first corrected injection amount, the first corrected injection amount being an amount of fuel injected from the first fuel injection valve, and correcting the base injection amount based on at least one of an intake state and an exhaust state of the second cylinder group to calculate a second corrected injection amount, the second corrected injection amount being an amount of fuel injected from the second fuel injection valve; and determining a first fuel injection count, the first fuel injection count being a number of times that fuel is injected from the first fuel injection valve during one combustion cycle, and a second fuel injection count, the second fuel injection count being a number of times that fuel is injected from the second fuel injection valve during one combustion cycle. When the first corrected injection amount and the second corrected injection amount are calculated using the same base injection amount, the first fuel injection count corresponding to the first corrected injection amount is set to be equal to the second fuel injection count corresponding to the second corrected injection amount.

BRIEF DESCRIPTION OF THE DRAWINGS

The invention, together with objects and advantages thereof, may best be understood by reference to the following description of the presently preferred embodiments together with the accompanying drawings in which:

FIG. 7 is a diagram illustrating the fuel injection count calculation process performed by the controller shown in FIG. 5.

DETAILED DESCRIPTION

First Embodiment

A first embodiment of the present invention will be hereinafter described with reference to FIGS. 1 to 4. First, a description will be given of a schematic configuration of a V-type eight-cylinder internal combustion engine 100 to which a controller 80 of the present embodiment is applied. In the following description, "upstream" and "downstream" that are simply used refer to the upstream side and the downstream side in a direction in which intake air and exhaust gases flow.

Figure 1:
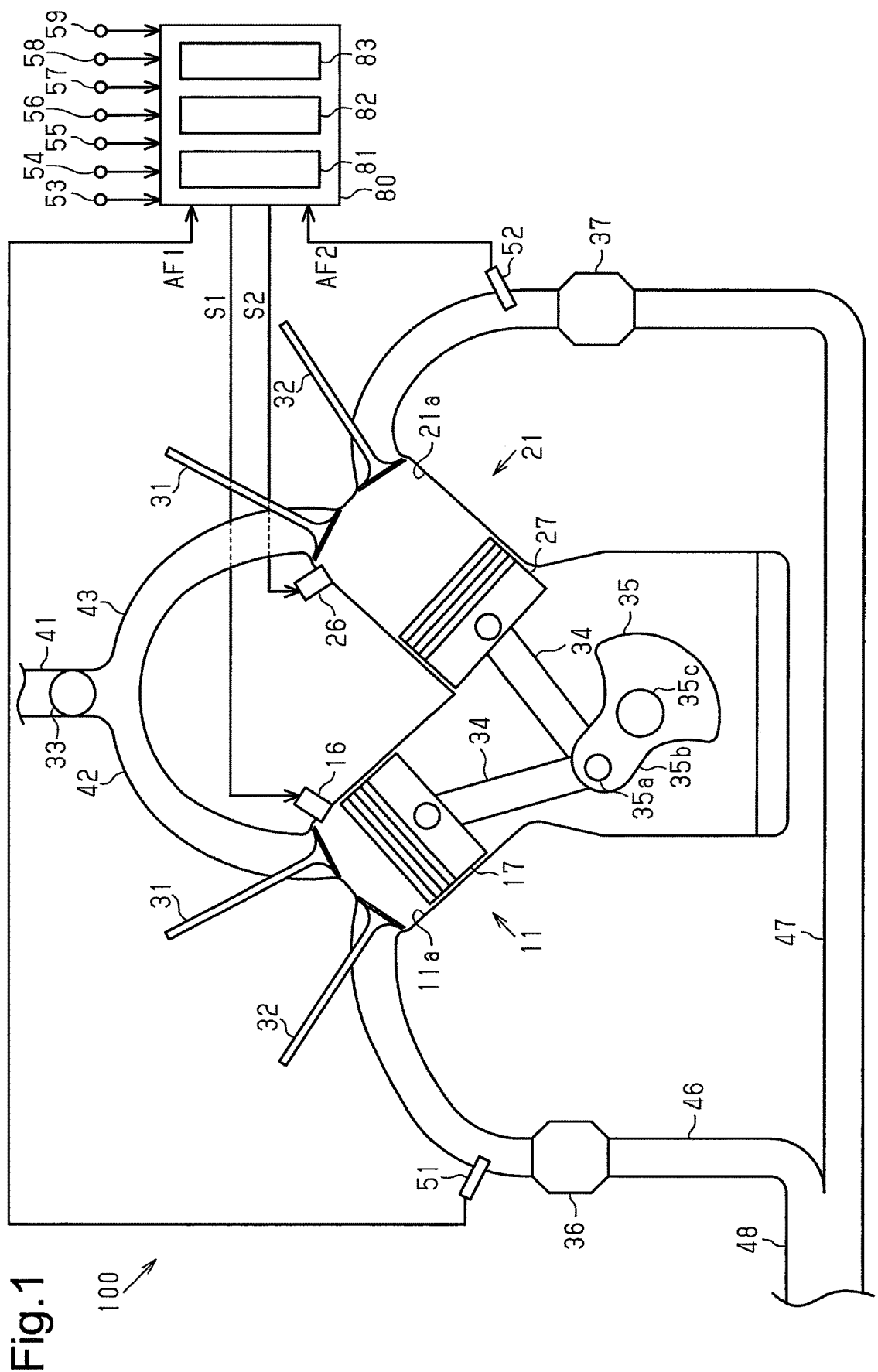
FIG. 1 is a schematic view of an internal combustion engine and a controller for the internal combustion engine according to a first embodiment.

As shown in FIG. 1, the internal combustion engine 100 includes a first bank 11 that has four cylinders 11a and a second bank 21 that has four cylinders 21a on the opposite side of the first bank 11 with a crankshaft 35 located between the second bank 21 and the first bank 11. In FIG. 1, only one of the four cylinders 11a of the first bank 11 is shown, and only one of the four cylinders 21a of the second bank 21 is shown. Additionally, the four cylinders 11a of the first bank 11 are configured to be a first cylinder group, and the four cylinders 21a of the second bank 21 are configured to be a second cylinder group.

The internal combustion engine 100 includes an intake-air passage 41 into which intake air is drawn from the outside. The intake-air passage 41 is provided with a throttle valve 33 that adjusts the amount of intake air that passes through the intake-air passage 41.

The part of the intake-air passage 41 at the downstream side of the throttle valve 33 branches into a first air intake pipe 42 and a second air intake pipe 43. The first air intake pipe 42 is connected to the cylinders 11a of the first bank 11. The downstream part of the first air intake pipe 42 branches into four pipes (not shown), and the four branched pipes are respectively connected to the four cylinders 11a of the first bank 11. The second air intake pipe 43 is connected to the cylinders 21a of the second bank 21. The downstream part of the second air intake pipe 43 branches into four pipes (not shown), and the branched four pipes are respectively connected to the four cylinders 21a of the second bank 21.

The cylinders 11a of the first bank 11 and the cylinders 21a of the second bank 21 are connected to an exhaust passage 48 through which exhaust gases are discharged from the cylinders 11a and 21a. The upstream part of the exhaust passage 48 branches into a first exhaust pipe 46 and a second exhaust pipe 47. The first exhaust pipe 46 is connected to the cylinders 11a of the first bank 11. The upstream part of the first exhaust pipe 46 branches into four pipes (not shown) respectively connected to the four cylinders 11a of the first bank 11, and the four pipes converge into one pipe. The first exhaust pipe 46 is provided with a first air-fuel ratio sensor 51 that detects the air-fuel ratio AF1 of exhaust gases discharged from the cylinders 11a of the first bank 11. The first air-fuel ratio sensor 51 is located at the downstream side of the converged part of the first exhaust pipe 46. A first catalyst 36 is arranged at the downstream side of the first air-fuel ratio sensor 51 in the first exhaust pipe 46 to remove carbon monoxide or nitrogen oxides from exhaust gases.

The second exhaust pipe 47 is connected to the cylinders 21a of the second bank 21. The upstream part of the second exhaust pipe 47 branches into four pipes (not shown) respectively connected to the four cylinders 21a of the second bank 21, and the four pipes converge into one pipe. The second exhaust pipe 47 is provided with a second air-fuel ratio sensor 52 that detects the air-fuel ratio AF2 of exhaust gases discharged from the cylinders 21a of the second bank 21. The second air-fuel ratio sensor 52 is located at the downstream side of the converged part of the second exhaust pipe 47. A second catalyst 37 is arranged at the downstream side of the second air-fuel ratio sensor 52 in the second exhaust pipe 47 to remove carbon monoxide or nitrogen oxides from exhaust gases.

A first piston 17 is arranged inside each cylinder 11a of the first bank 11 and reciprocates inside the cylinder 11a. The first piston 17 is connected to a crankpin 35a of the crankshaft 35 through a connecting rod 34. The crankpin 35a is connected to a crank journal 35c, which is the rotational center of the crankshaft 35, through a crank arm 35b.

A second piston 27 is arranged inside each cylinder 21a of the second bank 21 and reciprocates inside the cylinder 21a. The second piston 27 is connected to the crankpin 35a of the crankshaft 35 through a connecting rod 34. The crankpin 35a is connected to the crank journal 35c, which is the rotational center of the crankshaft 35, through the crank arm 35b.

The internal combustion engine 100 is provided with intake valves 31 that open and close the openings in the first air intake pipe 42 to the cylinders 11a. The internal combustion engine 100 is additionally provided with intake valves 31 that open and close the openings in the second air intake pipe 43 to the cylinders 21a.

The internal combustion engine 100 is provided with exhaust valves 32 that open and close the openings in the first exhaust pipe 46 to the cylinders 11a. The internal combustion engine 100 is additionally provided with exhaust valves 32 that open and close the openings the second exhaust pipe 47 in to the cylinders 21a.

The internal combustion engine 100 is provided with first direct injection valves 16 serving as first fuel injection valves that supply fuel to the inside of the cylinders 11a of the first bank 11. Each first direct injection valve 16 has an end directed to the inside of the cylinder 11a of the first bank 11 and directly injects fuel into the cylinder 11a. The first direct injection valve 16 is an electromagnetic type injection valve that is opened by being energized. The first direct injection valve 16 is capable of injecting fuel according to two modes of lift injections, namely, a full lift injection in which the valve member of the first direct injection valve 16 is fully opened and a partial lift injection in which the valve member of the first direct injection valve 16 is not fully opened. In the full lift injection, the first direct injection valve 16 is energized until the valve member of the first direct injection valve 16 is moved to a fully open position, and then stops being energized so as to stop the fuel injection. In the partial lift injection, before the valve member of the first direct injection valve 16 is moved to the fully open position, the first direct injection valve 16 stops being energized so as to stop the fuel injection. In the present embodiment, in total, four first direct injection valves 16 are provided to respectively supply fuel to the four cylinders 11a of the first bank 11.

The first direct injection valve 16 has a minimum full-lift injection amount QFmin, which is a minimum fuel injection amount of fuel that can be injected by the full lift injection. The minimum full-lift injection amount QFmin is determined by an energization time taken until the valve member of the first direct injection valve 16 is fully opened, the pressure of fuel supplied to the first direct injection valve 16, or other factors. The first direct injection valve 16 also has a minimum partial-lift injection amount QPmin, which is a minimum fuel injection amount of fuel that can be injected by the partial lift injection. The minimum partial-lift injection amount QPmin is determined by an energization time taken to appropriately open the valve member of the first direct injection valve 16, the pressure of fuel supplied to the first direct injection valve 16, or other factors.

The internal combustion engine 100 is provided with second direct injection valves 26 serving as second fuel injection valves that supply fuel to the inside of the cylinders 21a of the second bank 21. Each second direct injection valve 26 has an end directed to the inside of the cylinder 21a of the second bank 21 and directly injects fuel into the cylinder 21a. The second direct injection valve 26 is an electromagnetic type injection valve that is opened by being energized. The second direct injection valve 26 is capable of injecting fuel according to two modes of lift injections, namely, a full lift injection in which the valve member of the second direct injection valve 26 is fully opened and a partial lift injection in which the valve member of the second direct injection valve 26 is not fully opened. In the full lift injection, the second direct injection valve 26 is energized until the valve member of the second direct injection valve 26 is moved to a fully open position, and then stops being energized so as to stop the fuel injection. In the partial lift injection, before the valve member of the second direct injection valve 26 is moved to the fully open position, the second direct injection valve 26 stops being energized so as to stop the fuel injection. In the present embodiment, in total, the four second direct injection valves 26 are provided to respectively supply fuel to the four cylinders 21a of the second bank 21.

The second direct injection valve 26 has a minimum full-lift injection amount QFmin, which is a minimum fuel injection amount of fuel that can be injected by the full lift injection. The minimum full-lift injection amount QFmin is determined by an energization time taken until the valve member of the second direct injection valve 26 is fully opened, the pressure of fuel supplied to the second direct injection valve 26, or other factors. The second direct injection valve 26 also has a minimum partial-lift injection amount QPmin, which is a minimum fuel injection amount of fuel that can be injected by the partial lift injection. The minimum partial-lift injection amount QPmin is determined by an energization time taken to appropriately open the valve member of the second direct injection valve 26, the pressure of fuel supplied to the second direct injection valve 26, or other factors.

The second direct injection valve 26 is the same in specification as the first direct injection valve 16, and the minimum full-lift injection amount QFmin of the first direct injection valve 16 and the minimum full-lift injection amount QFmin of the second direct injection valve 26 are equal to each other. Likewise, the minimum partial-lift injection amount QPmin of the first direct injection valve 16 and the minimum partial-lift injection amount QPmin of the second direct injection valve 26 are equal to each other.

The controller 80 is electrically connected to the first direct injection valves 16 and the second direct injection valves 26. The controller 80 may be configured as circuitry that includes 1) one or more processors that operate in accordance with a computer program (software), 2) one or more dedicated hardware circuits, such as application specific integrated circuits (ASICs) that perform at least some of various processes, or 3) a combination of these. The processor includes a CPU and memory, such as a RAM and a ROM, and the memory stores program codes or commands configured to allow the CPU to execute processes. The memory, or a computer-readable medium, includes all available mediums that can be accessed by general-purpose computers or dedicated computers.

The controller 80 outputs a first driving signal S1, which controls the amount of fuel injected from the first direct injection valve 16, to the first direct injection valve 16. Additionally, the controller 80 outputs a second driving signal S2, which controls the amount of fuel injected from the second direct injection valve 26, to the second direct injection valve 26.

The controller 80 receives a signal indicating the air-fuel ratio AF1 of exhaust gases discharged from the cylinders 11a of the first bank 11 that is detected by the first air-fuel ratio sensor 51. The controller 80 also receives a signal indicating the air-fuel ratio AF2 of exhaust gases discharged from the cylinders 21a of the second bank 21 that is detected by the second air-fuel ratio sensor 52.

The controller 80 receives a signal indicating the number of rotations of the crankshaft 35 that are detected by a crank angle sensor 53. The controller 80 receives a signal indicating the amount of depression of an accelerator pedal that is detected by an accelerator operation amount sensor 54. The controller 80 receives a signal indicating the temperature of cooling water in the internal combustion engine 100 that is detected by a water temperature sensor 55. The controller 80 receives a signal indicating the amount of intake air passing through the intake-air passage 41 that is detected by an air flow meter 56. The controller 80 receives a signal indicating a throttle opening degree, which is the opening degree of the throttle valve 33 detected by a throttle position sensor 57. The controller 80 receives a signal indicating a temperature outside the vehicle that is detected by an outside air temperature sensor 58. The controller 80 receives a signal indicating the pressure of fuel supplied to the first direct injection valves 16 and the second direct injection valves 26 that is detected by a fuel pressure sensor 59.

The controller 80 includes an injection amount calculation portion 81 that calculates a base injection amount E, which is a base amount of fuel required during one combustion cycle, in accordance with a running state of the internal combustion engine 100. In detail, the injection amount calculation portion 81 calculates the base injection amount E based on various parameters, such as the number of rotations of the crankshaft 35, the amount of depression of the accelerator pedal, the amount of intake air detected by the air flow meter 56, the throttle opening degree, a target air-fuel ratio, which is a targeted air-fuel ratio, and a target torque, which is a targeted torque.

The controller 80 additionally includes an injection amount correction portion 82 that corrects the base injection amount E calculated by the injection amount calculation portion 81 to calculate a first corrected injection amount Ya, which is the amount of fuel injected from the first direct injection valves 16, and that corrects the base injection amount E calculated by the injection amount calculation portion 81 to calculate a second corrected injection amount Yb, which is the amount of fuel injected from the second direct injection valves 26. In detail, the injection amount correction portion 82 corrects the base injection amount E based on the air-fuel ratio AF1 of exhaust gases discharged from the cylinders 11a of the first bank 11 to calculate the first corrected injection amount Ya of each cylinder 11a of the first bank 11. Additionally, the injection amount correction portion 82 corrects the base injection amount E based on the air-fuel ratio AF2 of exhaust gases discharged from the cylinders 21a of the second bank 21 to calculate the second corrected injection amount Yb of each cylinder 21a of the second bank 21. In other words, in the present embodiment, the injection amount correction portion 82 calculates the first corrected injection amount Ya and the second corrected injection amount Yb based on the state of exhaust gases of the first bank 11 and based on the state of exhaust gases of the second bank 21.

The controller 80 includes an injection count determination portion 83 that determines the number of times that fuel is injected during one combustion cycle. The injection count determination portion 83 determines the injection mode to be one of a single injection mode in which the amount of fuel required during one combustion cycle is supplied to each cylinder by a single fuel injection and a divided injection mode in which the amount of fuel required during one combustion cycle is supplied to each cylinder through multiple fuel injections in accordance with the running state of the internal combustion engine 100. In other words, the injection count determination portion 83 allows the first direct injection valves 16 and the second direct injection valves 26 of the internal combustion engine 100 to perform the divided injection, in which the amount of fuel required during one combustion cycle is supplied to each cylinder through multiple injections. Additionally, when determining to perform the divided injection, the injection count determination portion 83 also determines the number of times that fuel is injected. In the present embodiment, the maximum number of times fuel is injected in the divided injection is three. The injection count determination portion 83 determines the number of times fuel is injected based on various parameters, such as the base injection amount E, the first corrected injection amount Ya, the second corrected injection amount Yb, the number of rotations of the crankshaft 35, the amount of depression of the accelerator pedal, the temperature of cooling water in the internal combustion engine 100, the amount of intake air detected by the air flow meter 56, the throttle opening degree, and the temperature outside the vehicle.

Additionally, the injection count determination portion 83 determines whether each fuel injection in one combustion cycle is performed by the full lift injection or the partial lift injection in accordance with the running state of the internal combustion engine 100. In detail, the injection count determination portion 83 determines the lift injection mode for each fuel injection based on various parameters, such as the base injection amount E, the first corrected injection amount Ya, the second corrected injection amount Yb, the number of times fuel is injected, the number of rotations of the crankshaft 35, the amount of depression of the accelerator pedal, the temperature of cooling water in the internal combustion engine 100, the amount of intake air, the throttle opening degree, and the temperature outside the vehicle.

Next, referring to FIGS. 2 and 3, a description will be given of a fuel injection count calculation process performed by the controller 80. The controller 80 repeatedly performs the fuel injection count calculation process in a predetermined control period when the internal combustion engine 100 is driven.

Figure 2:
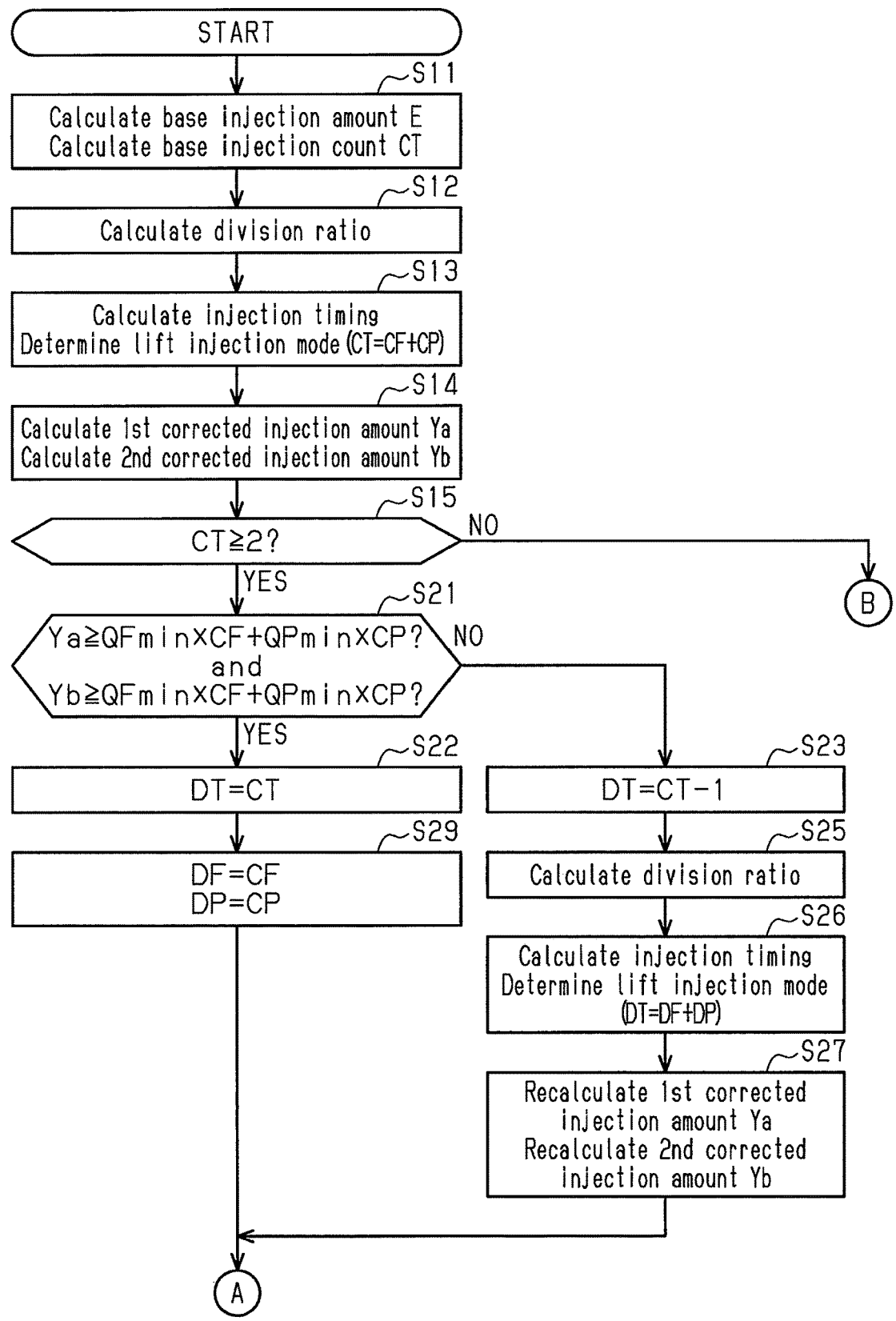
FIG. 2 is a flowchart of a fuel injection count calculation process that is performed by the controller shown in FIG. 1.
Figure 3:
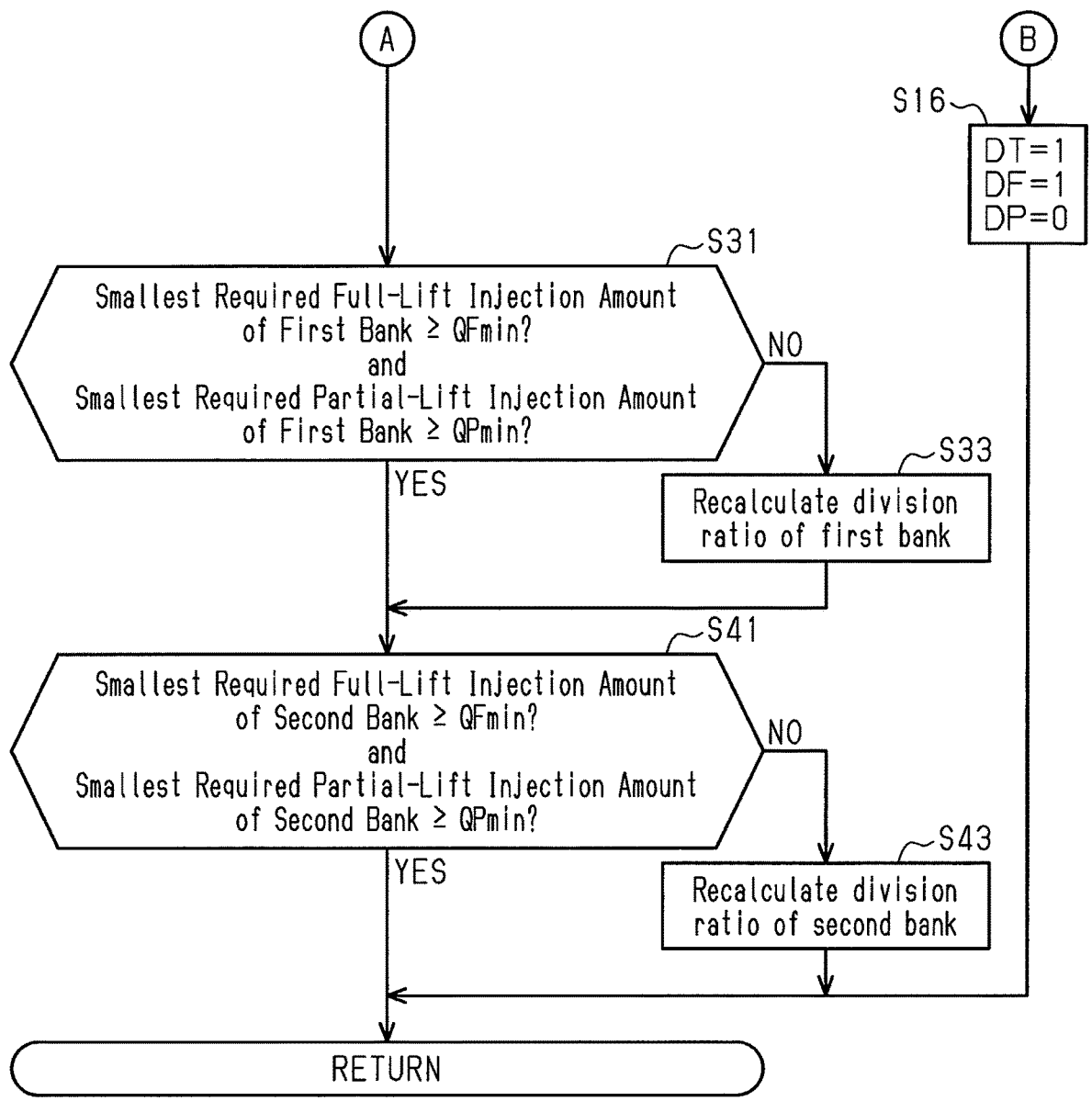
FIG. 3 is a flowchart of the fuel injection count calculation process performed by the controller shown in FIG. 1.

As shown in FIGS. 2 and 3, in step S11, the injection amount calculation portion 81 (controller 80) calculates a base injection amount E, which is a base amount of fuel required during one combustion cycle, in accordance with the running state of the internal combustion engine 100. As described above, the injection amount calculation portion 81 calculates the base injection amount E based on various parameters, such as the number of rotations of the crankshaft 35, the amount of depression of the accelerator pedal, the amount of intake air detected by the air flow meter 56, the throttle opening degree, the target air-fuel ratio, and the target torque. The base injection amount E is configured so as to be calculated as an injection amount somewhat greater than the minimum full-lift injection amount QFmin of the first direct injection valve 16 and the second direct injection valve 26.

Additionally, the injection count determination portion 83 (controller 80) determines a base injection count CT, which is a base number of times that fuel is injected, based on the running state of the internal combustion engine 100 and the base injection amount E. In detail, for example, if the base injection amount E is larger than or equal to a predetermined amount and the load of the internal combustion engine 100 is comparatively low, the injection count determination portion 83 determines the divided injection mode having three injections. For example, if the load of internal combustion engine 100 is comparatively high, the injection count determination portion 83 determines a single injection, or the single injection mode. Thereafter, the controller 80 allows the process to proceed to step S12.

In step S12, the injection count determination portion 83 (controller 80) calculates a division ratio that is a ratio at which the base injection amount E is divided for each injection based on the running state of the internal combustion engine 100, the base injection amount E, and the base injection count CT. For example, if the base injection count CT is three, the injection count determination portion 83 calculates that the division ratio of the base injection amount E is "7:2:1" in order from the earliest timing of injection. Additionally, if the base injection count CT is one, the injection count determination portion 83 calculates the division ratio so that the base injection amount E of fuel is injected by one injection. Thereafter, the controller 80 allows the process to proceed to step S13.

In step S13, the injection count determination portion 83 (controller 80) calculates the fuel injection timing for each injection in the base injection count CT based on the running state of the internal combustion engine 100, the base injection amount E, the base injection count CT, and the division ratio. For example, if the base injection count CT is three, the injection count determination portion 83 calculates the injection start timing and the injection end timing of each injection. Additionally, if the base injection count CT is one, the injection count determination portion 83 calculates the injection start timing and the injection end timing of that single injection.

Additionally, the injection count determination portion 83 (controller 80) determines whether each fuel injection in the base injection count CT is performed by the full lift injection or the partial lift injection based on the running state of the internal combustion engine 100, the base injection amount E, the base injection count CT, and the division ratio. In other words, the injection count determination portion 83 temporarily determines a base full lift injection count CF and a base partial lift injection count CP. For example, if the base injection count CT is three, the injection count determination portion 83 determines that, for example, all of the three injections are performed as a full lift injection or that the first two injections are performed as a full lift injection and the last injection is performed as a partial lift injection. Additionally, the injection count determination portion 83 determines the lift injection mode so that at least one full lift injection is included. Therefore, if the base injection count CT is one, the base full lift injection count CF is determined to be one, and the base partial lift injection count CP is determined to be zero.

When the lift injection mode is determined as described above, the injection count determination portion 83 determines that a fuel injection of an injection amount that is greater than or equal to the minimum full-lift injection amount QFmin is the full lift injection based on the base injection amount E, the division ratio, the pressure of fuel detected by the fuel pressure sensor 59, etc. Additionally, the injection count determination portion 83 determines that a fuel injection of an injection amount that is greater than or equal to the minimum partial-lift injection amount QPmin and less than the minimum full-lift injection amount QFmin is the partial lift injection based on the base injection amount E, the division ratio, the pressure of fuel detected by the fuel pressure sensor 59, etc. Thereafter, the controller 80 allows the process to proceed to step S14.

In step S14, the injection amount correction portion 82 (controller 80) corrects the base injection amount E based on the air-fuel ratio AF1 of exhaust gases discharged from the cylinders 11a of the first bank 11 to calculate the first corrected injection amount Ya of each cylinder 11a of the first bank 11. In detail, the injection amount correction portion 82 corrects the base injection amount E to calculate the first corrected injection amount Ya so that the air-fuel ratio AF1 detected by the first air-fuel ratio sensor 51 approaches the target air-fuel ratio. Likewise, the injection amount correction portion 82 (controller 80) corrects the base injection amount E based on the air-fuel ratio AF2 of exhaust gases discharged from the cylinders 21a of the second bank 21 to calculate the second corrected injection amount Yb of each cylinder 21a of the second bank 21. In detail, the injection amount correction portion 82 corrects the base injection amount E to calculate the second corrected injection amount Yb so that the air-fuel ratio AF2 detected by the second air-fuel ratio sensor 52 approaches the target air-fuel ratio. In more detail, the injection amount correction portion 82 calculates the first corrected injection amount Ya and the second corrected injection amount Yb based on the base injection amount E so that the first corrected injection amount Ya and the second corrected injection amount Yb are greater than or equal to the minimum full-lift injection amount QFmin of the first direct injection valve 16 and the second direct injection valve 26. Thereafter, the controller 80 allows the process to proceed to step S15.

In step S15, the injection count determination portion 83 (controller 80) determines whether the base injection count CT is two or more. If the base injection count CT is not two or more in step S15 (S15: NO), the controller 80 allows the process to proceed to step S16.

In step S16, the injection count determination portion 83 (controller 80) determines that a fuel injection count DT is one. When the base injection count CT is one, the lift injection mode of the single fuel injection is determined to be a full lift injection in step S13. Therefore, the injection count determination portion 83 determines that a full lift injection count DF is one without any change. Additionally, the injection count determination portion 83 determines that a partial lift injection count DP is zero. Thereafter, the present fuel injection count calculation process is ended. If the base injection count CT is two or more in step S15 (S15: YES), the controller 80 allows the process to proceed to step S21.

In step S21, the injection count determination portion 83 (controller 80) determines whether the first corrected injection amount Ya of fuel can be injected through the base injection count CT based on the minimum full-lift injection amount QFmin and the base full lift injection count CF and the minimum partial-lift injection amount QPmin and the base partial lift injection count CP. The minimum full-lift injection amount QFmin and the minimum partial-lift injection amount QPmin of the first direct injection valve 16 are calculated from, for example, the pressure of fuel detected by the fuel pressure sensor 59.

In detail, the injection count determination portion 83 determines whether the following condition is satisfied.

Condition (1): First Corrected Injection Amount Ya≥(Minimum Full-Lift Injection Amount QFmin×Base Full Lift Injection Count CF)+(Minimum Partial-Lift Injection Amount QPmin×Base Partial Lift Injection Count CP)

If condition (1) is satisfied, the injection count determination portion 83 temporarily determines that the fuel injection count corresponding to the first corrected injection amount Ya is the base injection count CT. For example, if the base injection count CT is three, the determination portion 83 temporarily determines that the fuel injection count corresponding to the first corrected injection amount Ya is three.

If condition (1) is not satisfied, the injection count determination portion 83 temporarily determines that the fuel injection count corresponding to the first corrected injection amount Ya is a fuel injection count that is smaller than the base injection count CT by one. For example, if the base injection count CT is three, the injection count determination portion 83 temporarily determines that the fuel injection count corresponding to the first corrected injection amount Ya is two.

Additionally, the injection count determination portion 83 (controller 80) determines whether the second corrected injection amount Yb of fuel can be injected through the base injection count CT based on the minimum full-lift injection amount QFmin and the base full lift injection count CF and the minimum partial-lift injection amount QPmin and the base partial lift injection count CP. The minimum full-lift injection amount QFmin and the minimum partial-lift injection amount QPmin of the second direct injection valve 26 are calculated from, for example, the pressure of fuel detected by the fuel pressure sensor 59.

In detail, the injection count determination portion 83 determines whether the following condition is satisfied.

Condition (2): Second Corrected Injection Amount Yb≥(Minimum Full-Lift Injection Amount QFmin×Base Full Lift Injection Count CF)+(Minimum Partial-Lift Injection Amount QPmin×Base Partial Lift Injection Count CP)

If condition (2) is satisfied, the injection count determination portion 83 temporarily determines that the fuel injection count corresponding to the second corrected injection amount Yb is the base injection count CT. For example, if the base injection count CT is three, the determination portion 83 temporarily determines that the fuel injection count corresponding to the second corrected injection amount Yb is three.

If condition (2) is not satisfied, the injection count determination portion 83 temporarily determines that the fuel injection count corresponding to the second corrected injection amount Yb is a fuel injection count that is smaller than the base injection count CT by one. For example, if the base injection count CT is three, the injection count determination portion 83 temporarily determines that the fuel injection count corresponding to the second corrected injection amount Yb is two.

If condition (1) and condition (2) are both satisfied in step S21 (S21: YES), the controller 80 allows the process to proceed to step S22. For example, when the base injection count CT is three, if the fuel injection count that has been temporarily determined with respect to the first corrected injection amount Ya is three and the fuel injection count that has been temporarily determined with respect to the second corrected injection amount Yb is three, the process proceeds to step S22.

In step S22, the injection count determination portion 83 (controller 80) determines that the fuel injection count DT is the base injection count CT. In other words, if the fuel injection count that has been temporarily determined with respect to the first corrected injection amount Ya and the fuel injection count that has been temporarily determined with respect to the second corrected injection amount Yb are each equal to the base injection count CT, the fuel injection count that has been temporarily determined with respect to the first corrected injection amount Ya and the fuel injection count that has been temporarily determined with respect to the second corrected injection amount Yb are each determined to be the fuel injection count DT. In other words, a first fuel injection count through which the first corrected injection amount Ya of fuel is injected is equal to a second fuel injection count through which the second corrected injection amount Yb of fuel is injected. Thereafter, the controller 80 allows the process to proceed to step S29.

In step S29, the injection count determination portion 83 (controller 80) determines that the full lift injection count DF is the base full lift injection count CF. Additionally, the injection count determination portion 83 (controller 80) determines that the partial lift injection count DP is the base partial lift injection count CP. The lift injection mode of each fuel injection in the first fuel injection count is the same as the lift injection mode of each fuel injection in the second fuel injection count. In particular, when it is determined that the first fuel injection count is N and that the second fuel injection count is N, where "N" is an integer greater than or equal to two, the first direct injection valve 16 and the second direct injection valve 26 each perform the N-th fuel injection, or the last injection, in the same lift injection mode. Thereafter, the controller 80 allows the process to proceed to step S31.

If at least one of condition (1) and condition (2) is not satisfied in step S21 (S21: NO), the controller 80 allows the process to proceed to step S23. For example, if the fuel injection count that has been temporarily determined with respect to the first corrected injection amount Ya differs from the fuel injection count that has been temporarily determined with respect to the second corrected injection amount Yb, the process proceeds to step S23. Additionally, if the fuel injection count that has been temporarily determined with respect to the first corrected injection amount Ya and the fuel injection count that has been temporarily determined with respect to the second corrected injection amount Yb are each different from the base injection count CT, the process proceeds to step S23 even if the fuel injection count that has been temporarily determined with respect to the first corrected injection amount Ya is equal to the fuel injection count that has been temporarily determined with respect to the second corrected injection amount Yb.

In step S23, the injection count determination portion 83 (controller 80) determines that the fuel injection count DT is a value obtained by decreasing the base injection count CT by one. Thus, if the fuel injection count that has been temporarily determined with respect to the first corrected injection amount Ya is less than the fuel injection count that has been temporarily determined with respect to the second corrected injection amount Yb, the fuel injection count that has been temporarily determined with respect to the second corrected injection amount Yb is decreased so as to conform to the fuel injection count that has been temporarily determined with respect to the first corrected injection amount Ya. If the fuel injection count that has been temporarily determined with respect to the second corrected injection amount Yb is less than the fuel injection count that has been temporarily determined with respect to the first corrected injection amount Ya, the fuel injection count that has been temporarily determined with respect to the first corrected injection amount Ya is decreased so as to conform to the fuel injection count that has been temporarily determined with respect to the second corrected injection amount Yb. As a result, the first fuel injection count through which the first corrected injection amount Ya of fuel is injected is equal to the second fuel injection count through which the second corrected injection amount Yb of fuel is injected. Thereafter, the controller 80 allows the process to proceed to step S25.

In step S25, the injection count determination portion 83 (controller 80) calculates a division ratio that is a ratio at which the first corrected injection amount Ya is divided for each injection based on the running state of the internal combustion engine 100, the first corrected injection amount Ya, and the fuel injection count DT. For example, if the fuel injection count DT is two, the injection count determination portion 83 calculates that the division ratio of the first corrected injection amount Ya is "7:3" in order from the earliest timing of injection. Additionally, if the fuel injection count DT is one, the injection count determination portion 83 calculates that the division ratio so that the first corrected injection amount Ya of fuel is injected by one injection.

Additionally, the injection count determination portion 83 (controller 80) calculates a division ratio that is a ratio at which the second corrected injection amount Yb is divided for each injection based on the running state of the internal combustion engine 100, the second corrected injection amount Yb, and the fuel injection count DT. For example, if the fuel injection count DT is two, the injection count determination portion 83 calculates that the division ratio of the second corrected injection amount Yb is "7:3" in order from the earliest timing of injection. If the fuel injection count DT is one, the injection count determination portion 83 calculates the division ratio so that the second corrected injection amount Yb of fuel is injected by one injection. Thereafter, the controller 80 allows the process to proceed to step S26.

In step S26, the injection count determination portion 83 (controller 80) calculates the timing of each fuel injection corresponding to the first corrected injection amount Ya based on the running state of the internal combustion engine 100, the first corrected injection amount Ya, the fuel injection count DT, and the division ratio. For example, if the fuel injection count DT is two, the injection count determination portion 83 calculates the injection start timing and the injection end timing of each injection. If the fuel injection count DT is one, the injection count determination portion 83 calculates the injection start timing and the injection end timing of the single injection.

Additionally, the injection count determination portion 83 (controller 80) calculates the timing of each fuel injection corresponding to the second corrected injection amount Yb based on the running state of the internal combustion engine 100, the second corrected injection amount Yb, the fuel injection count DT, and the division ratio. For example, if the fuel injection count DT is two, the injection count determination portion 83 calculates the injection start timing and the injection end timing of each injection. Additionally, if the fuel injection count DT is one, the injection count determination portion 83 calculates the injection start timing and the injection end timing of the single injection.

The injection count determination portion 83 (controller 80) determines whether each fuel injection corresponding to the first corrected injection amount Ya is performed by the full lift injection or the partial lift injection based on the running state of the internal combustion engine 100, the first corrected injection amount Ya, the fuel injection count DT, and the division ratio. In other words, the injection count determination portion 83 determines the full lift injection count DF and the partial lift injection count DP of the first corrected injection amount Ya. For example, if the fuel injection count DT is two, the injection count determination portion 83 determines, for example, that both of the two injections are performed as a full lift injection or that the earlier injection is performed as a full lift injection and the later injection is performed as a partial lift injection.

Additionally, the injection count determination portion 83 (controller 80) determines whether each fuel injection corresponding to the second corrected injection amount Yb is performed by the full lift injection or the partial lift injection based on the running state of the internal combustion engine 100, the second corrected injection amount Yb, the fuel injection count DT, and the division ratio. The injection count determination portion 83 sets the lift injection mode of each fuel injection corresponding to the second corrected injection amount Yb to be the same as the lift injection mode of each fuel injection in the first fuel injection count. In particular, if the injection count determination portion 83 determines that the first fuel injection count is N and that the second fuel injection count is N, where "N" is an integer greater than or equal to two, the first direct injection valve 16 and the second direct injection valve 26 each perform the N-th fuel injection, or the last injection, in the same lift injection mode. Additionally, it is determined that the full lift injection count DF and the partial lift injection count DP of the second corrected injection amount Yb are equal to the full lift injection count DF and the partial lift injection count DP of the first corrected injection amount Ya, respectively. Thereafter, the controller 80 allows the process to proceed to step S27.

In step S27, the injection amount correction portion 82 (controller 80) recalculates the first corrected injection amount Ya based on the running state of the internal combustion engine 100, the fuel injection count DT, and the air-fuel ratio AF1 of exhaust gases discharged from the cylinders 11a of the first bank 11. At this time, the fuel injection count is fixed to the fuel injection count DT that is calculated in step S23, and the division ratio is fixed to the division ratio that is calculated in step S25. Additionally, the lift injection mode of each fuel injection is fixed to the lift injection mode that is determined in step S26. Under this condition, the first corrected injection amount Ya is calculated so as to satisfy the target torque required for the internal combustion engine 100. The reason for the recalculation of the first corrected injection amount Ya is that when the fuel injection count DT changes from the base injection count CT that has been calculated or when the lift injection mode changes, the amount of fuel necessary in the cylinders 11a of the first bank 11 during one combustion cycle may change.

Additionally, the injection amount correction portion 82 (controller 80) recalculates the second corrected injection amount Yb based on the running state of the internal combustion engine 100, the fuel injection count DT, and the air-fuel ratio AF2 of exhaust gases discharged from the cylinders 21a of the second bank 21. At this time, the fuel injection count is fixed to the fuel injection count DT that is calculated in step S23, and the division ratio is fixed to the division ratio that is calculated in step S25. Additionally, the lift injection mode of each fuel injection is fixed to the lift injection mode that is determined in step S26. Under this condition, the second corrected injection amount Yb is calculated so as to satisfy the target torque required for the internal combustion engine 100. The reason for the recalculation of the second corrected injection amount Yb is that when the fuel injection count DT changes from the base injection count CT that has been calculated or when the lift injection mode changes, the amount of fuel necessary in the cylinders 21a of the second bank 21 during one combustion cycle may change. Thereafter, the controller 80 allows the process to proceed to step S31.

In step S31, the injection count determination portion 83 (controller 80) selects the full lift injection corresponding to the smallest required fuel injection amount from the full lift injections for the first bank 11. Thereafter, the injection count determination portion 83 (controller 80) determines whether a smallest required full-lift injection amount, which is the fuel injection amount required for the selected full lift injection, is greater than or equal to the minimum full-lift injection amount QFmin. The reason for performing this determination is that the first corrected injection amount Ya that has been corrected may be smaller than the base injection amount E, and accordingly, each fuel injection amount may be decreased. Consequently, in this case, even when, for example, the division ratio remains the same, the smallest required full-lift injection amount of the full lift injection for the first bank 11 may be smaller than the minimum full-lift injection amount QFmin.

More specifically, the injection count determination portion 83 determines whether the following condition is satisfied.

Condition (3): Smallest Required Full-Lift Injection Amount of Full Lift Injection for First Bank 11≥Minimum Full-Lift Injection Amount QFmin Additionally, the injection count determination portion 83 (controller 80) selects the partial lift injection corresponding to the smallest required fuel injection amount from the partial lift injections for the first bank 11. Thereafter, the injection count determination portion 83 (controller 80) determines whether a smallest required partial-lift injection amount, which is the fuel injection amount required for the selected partial lift injection, is greater than or equal to the minimum partial-lift injection amount QPmin. The reason for performing this determination is that the first corrected injection amount Ya that has been corrected may be smaller than the base injection amount E, and accordingly, each fuel injection amount may be decreased. Consequently, in this case, even when, for example, the division ratio remains the same, the smallest required partial-lift injection amount of the partial lift injection for the first bank 11 may be smaller than the minimum partial-lift injection amount QPmin.

More specifically, the injection count determination portion 83 determines whether the following condition is satisfied.

Condition (4): Smallest Required Partial-Lift Injection Amount of Partial Lift Injection for First Bank 11≥Minimum Partial-Lift Injection Amount QPmin If condition (3) and condition (4) are both satisfied in step S31 (S31: YES), the controller 80 allows the process to proceed to step S41. If at least one of condition (3) and condition (4) is not satisfied in step S31 (S31: NO), the controller 80 allows the process to proceed to step S33.

In step S33, the injection count determination portion 83 (controller 80) recalculates the division ratio of the first bank 11 so as to satisfy condition (3) and condition (4). In the recalculation, the division ratio is calculated so as to be maximally close to the division ratio that was precedingly calculated. In detail, the ratio corresponding to an injection event injecting a large amount of fuel is decreased, whereas the ratio corresponding to an injection event injecting a small amount of fuel is increased. For example, if the precedingly calculated division ratio is "7:3" and changing of the division ratio to "6:4" or "5:5" satisfies condition (3) and condition (4), the injection count determination portion 83 determines that the division ratio is recalculated to be "6:4," which is closer to the previous division ratio of "7:3." Thereafter, the controller 80 allows the process to proceed to step S41.

In step S41, the injection count determination portion 83 (controller 80) selects the full lift injection corresponding to the smallest required fuel injection amount from the full lift injections for the second bank 21. Thereafter, the injection count determination portion 83 (controller 80) determines whether a smallest required full-lift injection amount, which is the fuel injection amount required for the selected full lift injection, is greater than or equal to the minimum full-lift injection amount QFmin. The reason for performing this determination is that the second corrected injection amount Yb that has been corrected may be smaller than the base injection amount E, and accordingly, each fuel injection amount may be decreased. Consequently, in this case, even when, for example, the division ratio remains the same, the smallest required full-lift injection amount of the full lift injection for the second bank 21 may be smaller than the minimum full-lift injection amount QFmin.

More specifically, the injection count determination portion 83 determines whether the following condition is satisfied.

Condition (5): Smallest Required Full-Lift Injection Amount of Full Lift Injection for Second Bank 21≥Minimum Full-Lift Injection Amount QFmin Additionally, the injection count determination portion 83 (controller 80) selects the partial lift injection corresponding to the smallest required fuel injection amount from the partial lift injections for the second bank 21. Thereafter, the injection count determination portion 83 (controller 80) determines whether a smallest required partial-lift injection amount, which is the fuel injection amount required for the selected partial lift injection, is greater than or equal to the minimum partial-lift injection amount QPmin. The reason for performing this determination is that the second corrected injection amount Yb that has been corrected may be smaller than the base injection amount E, and accordingly, each fuel injection amount may be decreased. Consequently, in this case, even when, for example, the division ratio remains the same, the smallest required partial-lift injection amount of the partial lift injection for the second bank 21 may be smaller than the minimum partial-lift injection amount QPmin.

More specifically, the injection count determination portion 83 determines whether the following condition is satisfied.

Condition (6): Smallest Required Partial-Lift Injection Amount of Partial Lift Injection for Second Bank 21≥Minimum Partial-Lift Injection Amount QPmin If condition (5) and condition (6) are both satisfied in step S41 (S41: YES), the controller 80 ends the present fuel injection count calculation process. If at least one of condition (5) and condition (6) is not satisfied in step S41 (S41: NO), the controller 80 allows the process to proceed to step S43.

In step S43, the injection count determination portion 83 (controller 80) recalculates the division ratio of the second bank 21 so as to satisfy both condition (5) and condition (6). The division ratio is recalculated so as to be maximally close to the precedingly calculated division ratio. In detail, the ratio corresponding to an injection event injecting a large amount of fuel is decreased, whereas the ratio corresponding to an injection event injecting a small amount of fuel is increased. For example, if the precedingly calculated division ratio is "7:3" and changing of the division ratio to "6:4" or "5:5" satisfies both condition (5) and condition (6), the injection count determination portion 83 determines that the division ratio is recalculated to be "6:4," which is closer to the previous division ratio of "7:3." Thereafter, the controller 80 ends the present fuel injection count calculation process.

Next, the operation of the present embodiment will be described.

Figure 4:
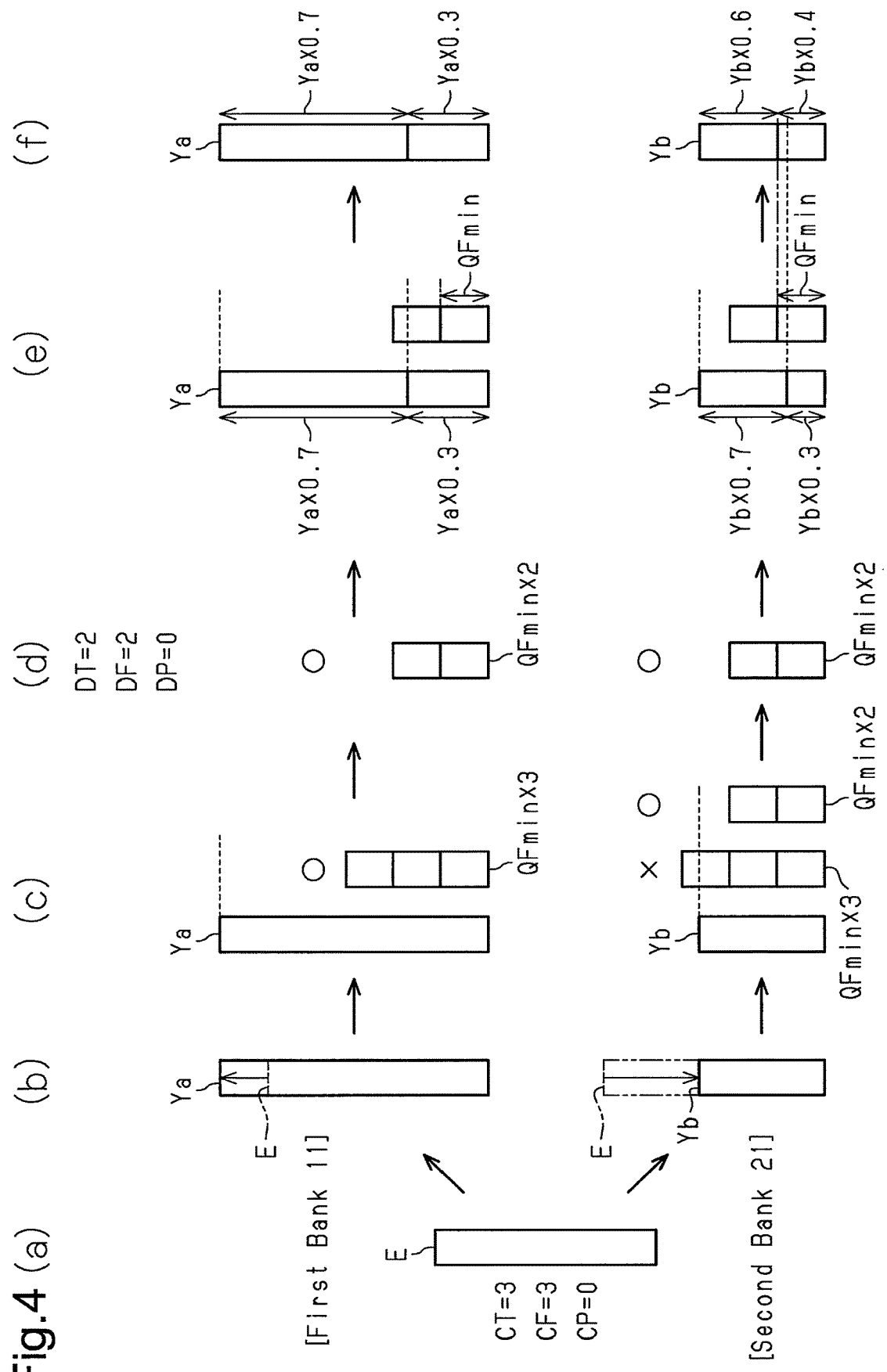
FIG. 4 is a diagram illustrating the fuel injection count calculation process performed by the controller shown in FIG. 1.

As shown in (a) in FIG. 4, it is assumed that the injection amount calculation portion 81 (controller 80) has calculated a base injection amount E. Additionally, it is assumed that the injection count determination portion 83 (controller 80) has determined that the base injection count CT is three and that the base full lift injection count CF is three (the base partial lift injection count CP is zero) with respect to the base injection amount E.

For example, if there is an individual difference between the first direct injection valve 16 and the second direct injection valve 26 or if there is a difference in fuel injection properties between the two valves 16 and 26 because of, for example, deterioration due to age, a difference may occur between the actual amount of fuel injected from the first direct injection valve 16 and the actual amount of fuel injected from the second direct injection valve 26. As a result, a difference also occurs between the air-fuel ratio AF1 detected from the first air-fuel ratio sensor 51 corresponding to the first bank 11 and the air-fuel ratio AF2 detected from the second air-fuel ratio sensor 52 corresponding to the second bank 21. Accordingly, as shown in (b) in FIG. 4, a difference occurs between the first corrected injection amount Ya calculated based on the air-fuel ratio AF1 of exhaust gases discharged from the cylinders 11a of the first bank 11 and the second corrected injection amount Yb calculated based on the air-fuel ratio AF2 of exhaust gases discharged from the cylinders 21a of the second bank 21. The corrected amounts with respect to the base injection amount E are exaggerated in (b) in FIG. 4.

As shown in (c) in FIG. 4, the injection count determination portion 83 (controller 80) determines whether the first corrected injection amount Ya can be injected through the base injection count CT, which is three. The three injections of the base injection count CT all have been determined as a full lift injection, and therefore the injection count determination portion 83 compares the first corrected injection amount Ya with the total of the minimum full-lift injection amount QFmin that will be injected through three injections. In this case, the first corrected injection amount Ya is greater than or equal to the total of the minimum full-lift injection amount QFmin injected through three injections. Thus, the injection count determination portion 83 temporarily determines that the fuel injection count corresponding to the first corrected injection amount Ya is three. In other words, the fuel injection count that has been temporarily determined with respect to the first corrected injection amount Ya is equal to the base injection count CT, which is three.

Additionally, the injection count determination portion 83 (controller 80) determines whether the second corrected injection amount Yb can be injected through the base injection count CT, which is three. The three injections of the base injection count CT all have been determined as a full lift injection, and therefore the injection count determination portion 83 compares the second corrected injection amount Yb with the total of the minimum full-lift injection amount QFmin that will be injected through three injections. In this case, the second corrected injection amount Yb is less than the total of the minimum full-lift injection amount QFmin injected through three injections. Thus, the injection count determination portion 83 temporarily determines that the fuel injection count corresponding to the second corrected injection amount Yb is two and is smaller by one than the base injection count CT, which is three.

The fuel injection count with respect to the first corrected injection amount Ya, which is temporarily determined to be three, differs from the fuel injection count with respect to the second corrected injection amount Yb, which is temporarily determined to be two. For example, if fuel injection is actually performed based on the fuel injection count with respect to the first corrected injection amount Ya, which is temporarily determined to be three, and the fuel injection count with respect to the second corrected injection amount Yb, which is temporarily determined to be two, the combustion state of the cylinders 11a of the first bank 11 and the combustion state of the cylinders 21a of the second bank 21 would be unbalanced, causing, for example, vibration and noise.

In this regard, in the present embodiment, if the fuel injection count with respect to the first corrected injection amount Ya, which is temporarily determined to be three, differs from the fuel injection count with respect to the second corrected injection amount Yb, which is temporarily determined to be two, as shown in (d) in FIG. 4, the fuel injection count is reduced by one from three, which is the base injection count CT, so that the fuel injection count DT is determined to be two. Consequently, the first fuel injection count to inject the first corrected injection amount Ya is equal to the second fuel injection count to inject the second corrected injection amount Yb.

As described, in the present embodiment, even when a difference occurs between the first corrected injection amount Ya of the first bank 11 and the second corrected injection amount Yb of the second bank 21, the first fuel injection count of the first bank 11 is set to be equal to the second fuel injection count of the second bank 21. This prevents the combustion state of the cylinders 11a of the first bank 11 and the combustion state of the cylinders 21a of the second bank 21 from becoming unbalanced, which would occur when the first fuel injection count differs from the second fuel injection count. This, then, limits vibration and noise that occur when the combustion state of the first bank 11 and the combustion state of the second bank 21 are unbalanced.

Additionally, in the present embodiment, when setting the first fuel injection count through which the first corrected injection amount Ya of fuel is injected to be equal to the second fuel injection count through which the second corrected injection amount Yb of fuel is injected, any of the fuel injection count temporarily determined with respect to the first corrected injection amount Ya and the fuel injection count temporarily determined with respect to the second corrected injection amount Yb will not be increased. This limits situations in which the amount of fuel per injection from the first direct injection valve 16 and the second direct injection valve 26 is decreased by an increase in the fuel injection count. This, then, limits variations in the fuel injection amount between the first direct injection valve 16 and the second direct injection valve 26 that result when the amount of fuel per injection from the first direct injection valve 16 or the second direct injection valve 26 is excessively small.

As shown in (e) in FIG. 4, it is assumed that the injection count determination portion 83 (controller 80) has calculated that the division ratio at which the first corrected injection amount Ya is divided for each injection is "7:3" in order from the earliest timing of injection. Additionally, it is assumed that the injection count determination portion 83 (controller 80) has determined that the lift injection mode in each fuel injection corresponding to the first corrected injection amount Ya is a full lift injection for both of the two injections of the fuel injection count DT. That is, it is assumed that the full lift injection count DF has been determined to be two (the base partial lift injection count CP is zero).

It is assumed that the injection count determination portion 83 (controller 80) has calculated that the division ratio at which the second corrected injection amount Yb is divided for each injection is "7:3" in order from the earliest timing of injection. Additionally, the injection count determination portion 83 (controller 80) sets the lift injection mode of each fuel injection corresponding to the second corrected injection amount Yb to be the same as the lift injection mode of each fuel injection in the first fuel injection count. In particular, when it is determined that the first fuel injection count is N and that the second fuel injection count is N, where "N" is an integer greater than or equal to two, the first direct injection valve 16 and the second direct injection valve 26 each perform the N-th fuel injection, or the last injection, in the same lift injection mode.

Even when the first fuel injection count of the first bank 11 and the second fuel injection count of the second bank 21 are each set to N and are equal to each other, where "N" is an integer greater than or equal to two, the combustion state of the cylinders 11*a* of the first bank 11 and the combustion state of the cylinders 21*a* of the second bank 21 may be unbalanced. In detail, if the atomization state of fuel excessively differs between the first bank 11 and the second bank 21 in the N-th fuel injection, in which the time from fuel injection to combustion is comparatively short and the combustion state is easily affected, the combustion state of the cylinders 11*a* of the first bank 11 and the combustion state of the cylinders 21*a* of the second bank 21 may be unbalanced. In particular, if the lift injection mode of N-th fuel injection is determined so that the fuel injection of one of the first bank 11 and the second bank 21 is a full lift injection and that the fuel injection of the other one of the first bank 11 and the second bank 21 is a partial lift injection, the difference in the atomization state of fuel in the N-th fuel injection between of the first bank 11 and the second bank 21 tends to be large.

In this regard, in the present embodiment, in the N-th fuel injection, in which the time from fuel injection to combustion is comparatively short and the combustion state is easily affected, the difference between the atomization state of fuel in the fuel injection of the first bank 11 and the atomization state of fuel in the fuel injection of the second bank 21 is expected to be smaller than a case in which the lift injection mode of the first bank 11 differs from the lift injection mode of the second bank 21. This further effectively prevents the combustion state of the cylinder 11*a* of the first bank 11 and the combustion state of the cylinders 21*a* of the second bank 21 from becoming unbalanced.

As shown in (e) in FIG. 4, the injection amount correction portion 82 (controller 80) recalculates the first corrected injection amount Ya based on the air-fuel ratio AF1 and the second corrected injection amount Yb based on the air-fuel ratio AF2. In (e) in FIG. 4, the first corrected injection amount Ya that was precedingly calculated and the first corrected injection amount Ya that is recalculated are the same size. Additionally, in (e) in FIG. 4, the second corrected injection amount Yb that was precedingly calculated and the second corrected injection amount Yb that is recalculated are the same size.

The injection count determination portion 83 (controller 80) determines whether the smallest required full-lift injection amount of the full lift injections in the first bank 11 is greater than or equal to the minimum full-lift injection amount QFmin. In detail, the injection count determination portion 83 (controller 80) determines whether the smallest one of the injection amounts in the full lift injections at the division ratio of the first corrected injection amount Ya that is calculated to be "7:3," or the first corrected injection amount Ya×0.3, is greater than or equal to the minimum full-lift injection amount QFmin. In this case, the first corrected injection amount Ya×0.3 is greater than or equal to the minimum full-lift injection amount QFmin. Thus, as shown in (f) in FIG. 4, the division ratio of the first corrected injection amount Ya is determined to be "7:3."

As shown in (e) in FIG. 4, the injection count determination portion 83 (controller 80) determines whether the smallest required full-lift injection amount of the full lift injections in the second bank 21 is greater than or equal to the minimum full-lift injection amount QFmin. In detail, the injection count determination portion 83 (controller 80) determines whether the smallest one of the injection amounts in the full lift injections at the division ratio of the second corrected injection amount Yb that is calculated to be "7:3," or the second corrected injection amount Yb×0.3, is greater than or equal to the minimum full-lift injection amount QFmin.

In this case, the second corrected injection amount Yb×0.3 is less than the minimum full-lift injection amount QFmin. Thus, the injection count determination portion 83 calculates that the division ratio of the second corrected injection amount Yb is maximally close to the precedingly calculated division ratio. In detail, as shown in (f) in FIG. 4, the division ratio is recalculated so that the smallest required full-lift injection amount of the full lift injections in the second bank 21 is equal to the minimum full-lift injection amount QFmin. The division ratio of the second corrected injection amount Yb is "6:4."

The present embodiment has advantages described below.

(1) In the present embodiment, even when a difference occurs between the first corrected injection amount Ya of the first bank 11 and the second corrected injection amount Yb of the second bank 21, the first fuel injection count of the first bank 11 is equal to the second fuel injection count of the second bank 21. This prevents the combustion state of the cylinders 11*a* of the first bank 11 and the combustion state of the cylinders 21*a* of the second bank 21 from becoming unbalanced, which would occur when the first fuel injection count differs from the second fuel injection count. This, then, limits vibration and noise that occur when the combustion state of the first bank 11 and the combustion state of the second bank 21 are unbalanced.

(2) In the present embodiment, when it is determined that the first fuel injection count is N and that the second fuel injection count is N, where "N" is an integer greater than or equal to two, the first direct injection valve 16 and the second direct injection valve 26 each perform the N-th fuel injection, or the last injection, in the same lift injection mode. Thus, in the N-th fuel injection, in which the time from fuel injection to combustion is comparatively short and the combustion state is easily affected, the difference between the atomization state of fuel in the fuel injection of the first bank 11 and the atomization state of fuel in the fuel injection of the second bank 21 is expected to be smaller than a case in which the lift injection mode of the first bank 11 differs from the lift injection mode of the second bank 21. This further effectively prevents the combustion state of the cylinders 11a of the first bank 11 and the combustion state of the cylinders 21a of the second bank 21 from becoming unbalanced.

(3) In the present embodiment, when setting the first fuel injection count through which the first corrected injection amount Ya of fuel is injected to be equal to the second fuel injection count through which the second corrected injection amount Yb of fuel is injected, any of the fuel injection count temporarily determined with respect to the first corrected injection amount Ya and the fuel injection count temporarily determined with respect to the second corrected injection amount Yb will not be increased. This limits situations in which the amount of fuel per injection from the first direct injection valve 16 and the second direct injection valve 26 is decreased by an increase in the fuel injection count. This, then, limits variations in the fuel injection amount between the first direct injection valve 16 and the second direct injection valve 26 that result when the amount of fuel per injection from the first direct injection valve 16 or the second direct injection valve 26 is excessively small.

Second Embodiment

Next, a second embodiment of the present invention will be described with reference to FIGS. 5 to 7. The controller 80 of the present embodiment and the internal combustion engine 100 to which the controller 80 is applied are configured in the same manner as in the first embodiment. The second embodiment differs from the first embodiment in the fuel injection count calculation process performed by the controller 80.

Figure 5:
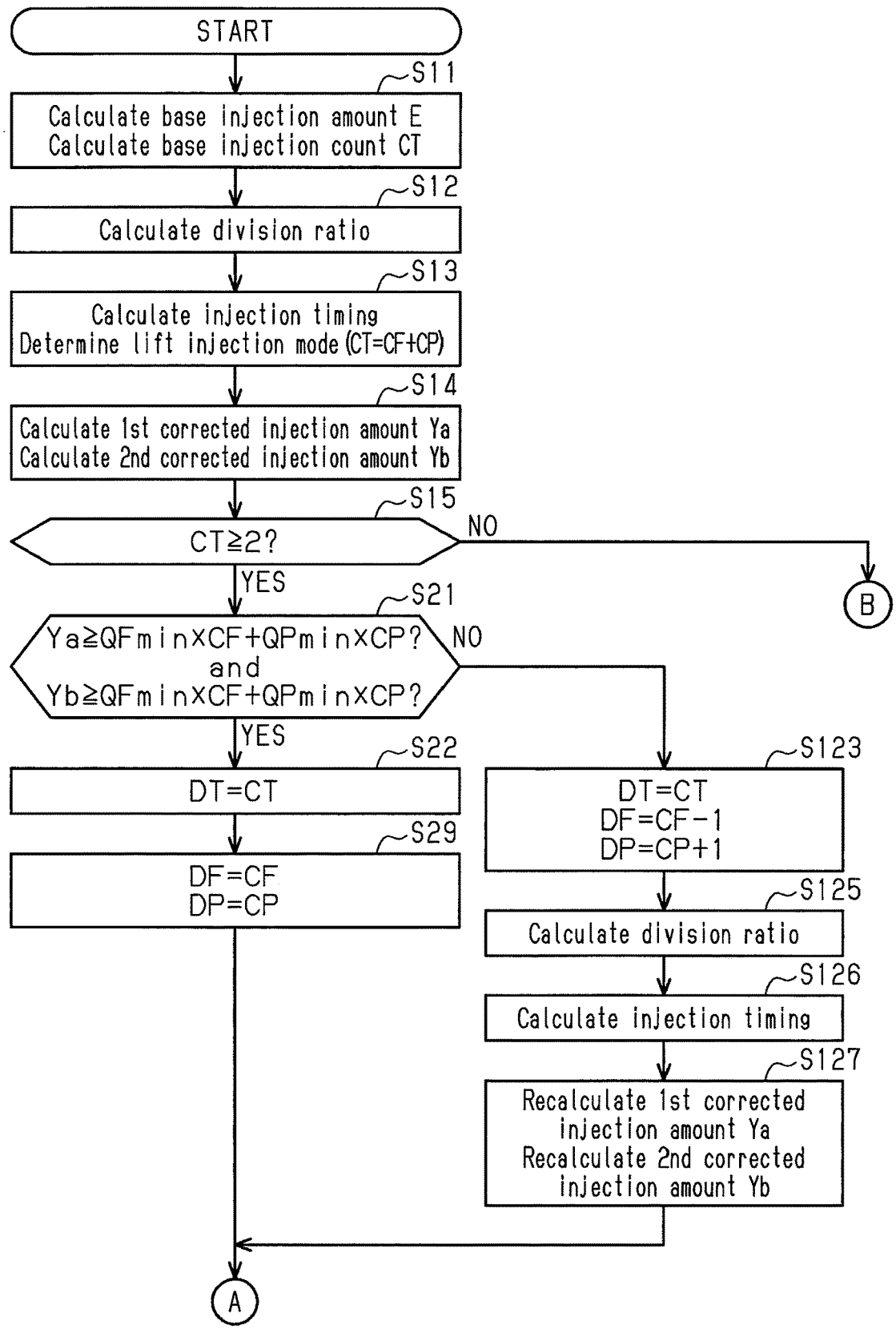
FIG. 5 is a flowchart of a fuel injection count calculation process that is performed by a controller for an internal combustion engine according to a second embodiment.
Figure 6:
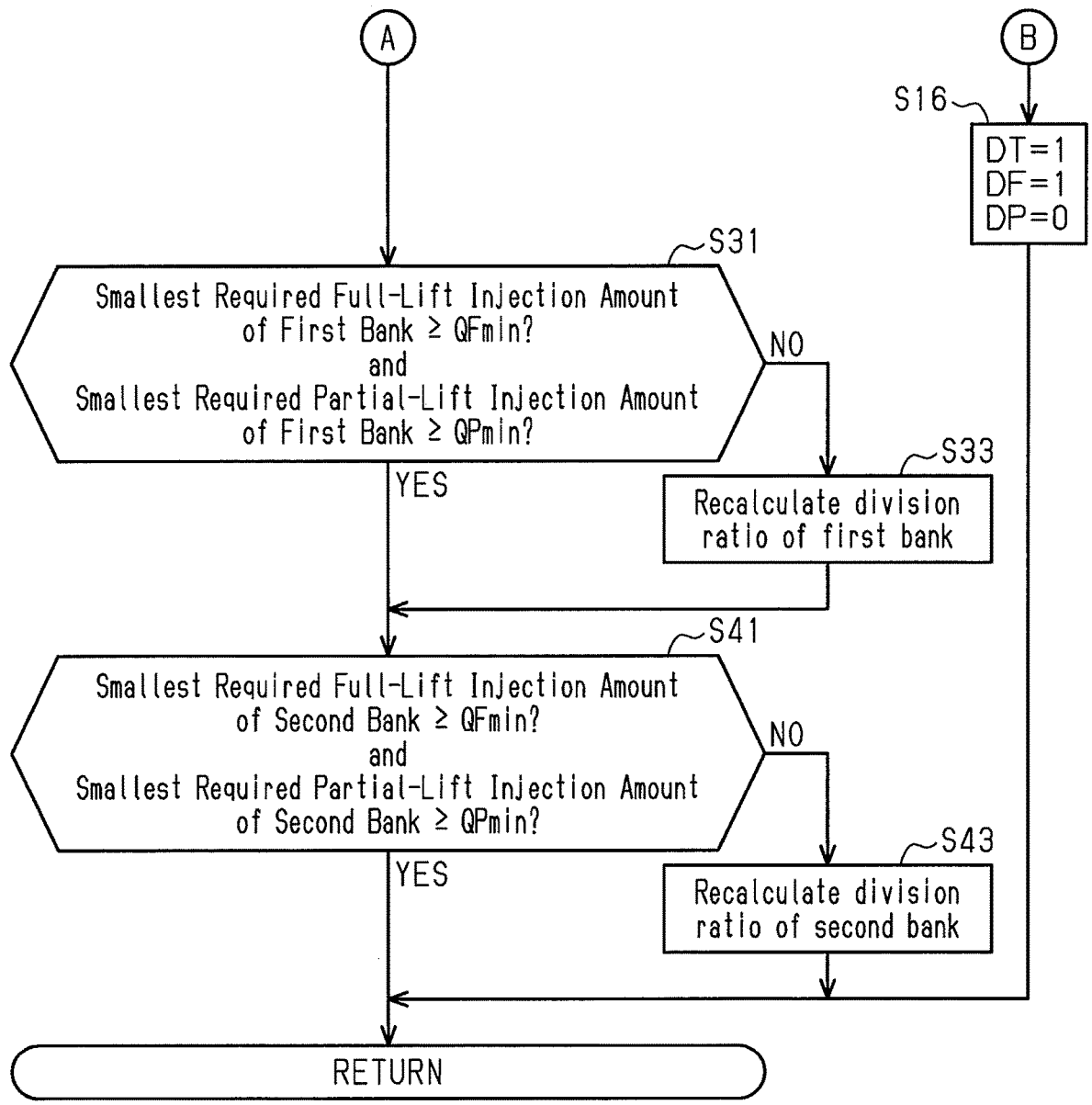
FIG. 6 is a flowchart of the fuel injection count calculation process performed by the controller shown in FIG. 5.

Referring to FIGS. 5 and 6, a description will be given of a fuel injection count calculation process performed by the controller 80. In the following description of the second embodiment, the differences from the first embodiment are mainly described. The same reference characters are given to those configurations that are the same as the corresponding configurations of the first embodiment. Such configurations will not be described in detail.

As shown in FIGS. 5 and 6, if at least one of condition (1) and condition (2) is not satisfied in step S21 (S21: NO), the controller 80 allows the process to proceed to step S123. For example, if the fuel injection count temporarily determined with respect to the first corrected injection amount Ya differs from the fuel injection count temporarily determined with respect to the second corrected injection amount Yb, the process proceeds to step S123. Additionally, even when the fuel injection count temporarily determined with respect to the first corrected injection amount Ya is equal to the fuel injection count temporarily determined with respect to the second corrected injection amount Yb, if the fuel injection count temporarily determined with respect to the first corrected injection amount Ya and the fuel injection count temporarily determined with respect to the second corrected injection amount Yb differ from the base injection count CT, the process proceeds to step S123.

In step S123, the injection count determination portion 83 (controller 80) determines that the full lift injection count DF is a value obtained by decreasing the base full lift injection count CF by one. Additionally, the injection count determination portion 83 (controller 80) determines that the partial lift injection count DP is a value obtained by increasing the base partial lift injection count CP by one. Thereafter, the injection count determination portion 83 (controller 80) determines that the fuel injection count DT is the base injection count CT. Therefore, if the fuel injection count temporarily determined with respect to the first corrected injection amount Ya is smaller than the fuel injection count temporarily determined with respect to the second corrected injection amount Yb, the fuel injection count temporarily determined with respect to the first corrected injection amount Ya is increased so as to conform to the fuel injection count temporarily determined with respect to the second corrected injection amount Yb. If the fuel injection count temporarily determined with respect to the second corrected injection amount Yb is smaller than the fuel injection count temporarily determined with respect to the first corrected injection amount Ya, the fuel injection count temporarily determined with respect to the second corrected injection amount Yb is increased so as to conform to the fuel injection count temporarily determined with respect to the first corrected injection amount Ya. As a result, the first fuel injection count through which the first corrected injection amount Ya of fuel is injected is equal to the second fuel injection count through which the second corrected injection amount Yb of fuel is injected. Thereafter, the controller 80 allows the process to proceed to step S125.

In step S125, the injection count determination portion 83 (controller 80) calculates a division ratio that is a ratio at which the first corrected injection amount Ya is divided for each injection based on the running state of the internal combustion engine 100, the first corrected injection amount Ya, the fuel injection count DT, the full lift injection count DF, and the partial lift injection count DP. For example, if the fuel injection count DT is three, the injection count determination portion 83 calculates that the division ratio of the first corrected injection amount Ya is "7:2:1" in order from the earliest timing of injection. When the division ratio of the first corrected injection amount Ya is "7:2:1," the injection count determination portion 83 determines the lift injection mode of each fuel injection in the first fuel injection count so that, for example, the first two injections are performed as a full lift injection and the last injection is performed as a partial lift injection.

Additionally, the injection count determination portion 83 (controller 80) calculates a division ratio that is a ratio at which the second corrected injection amount Yb is divided for each injection based on the running state of the internal combustion engine 100, the second corrected injection amount Yb, the fuel injection count DT, the full lift injection count DF, and the partial lift injection count DP. For example, if the fuel injection count DT is three, the injection count determination portion 83 calculates that the division ratio of the second corrected injection amount Yb is "7:2:1" in order from the earliest timing of injection.

Additionally, the injection count determination portion 83 (controller 80) sets the lift injection mode of each fuel injection in the first fuel injection count to be the same as the lift injection mode of each fuel injection in the second fuel injection count. For example, if the lift injection mode of each fuel injection in the first fuel injection count is set so that the first two injections are performed as a full lift injection and the last injection is performed as a partial lift injection, the injection count determination portion 83 (controller 80) determines that the lift injection mode of each fuel injection in the second fuel injection count so that the first two injections are performed as a full lift injection and the last injection is performed as a partial lift injection. In particular, when it is determined that the first fuel injection count is N and that the second fuel injection count is N, where "N" is an integer greater than or equal to two, the first direct injection valve 16 and the second direct injection valve 26 each perform the N-th fuel injection, or the last injection, in the same lift injection mode. Thereafter, the controller 80 allows the process to proceed to step S126.

In step S126, the injection count determination portion 83 (controller 80) calculates the fuel injection timing for each injection of the first corrected injection amount Ya based on the running state of the internal combustion engine 100, the first corrected injection amount Ya, the fuel injection count DT, the full lift injection count DF, the partial lift injection count DP, and the division ratio. For example, if the fuel injection count DT is three, the injection count determination portion 83 calculates the injection start timing and the injection end timing of each injection.

Additionally, the injection count determination portion 83 (controller 80) calculates the fuel injection timing for each injection of the second corrected injection amount Yb based on the running state of the internal combustion engine 100, the second corrected injection amount Yb, the fuel injection count DT, the full lift injection count DF, the partial lift injection count DP, and the division ratio. For example, if the fuel injection count DT is three, the injection count determination portion 83 calculates the injection start timing and the injection end timing of each injection. Thereafter, the controller 80 allows the process to proceed to step S127.

In step S127, the injection amount correction portion 82 (controller 80) recalculates the first corrected injection amount Ya based on the running state of the internal combustion engine 100, the fuel injection count DT, the full lift injection count DF, the partial lift injection count DP, and the air-fuel ratio AF1 of exhaust gases discharged from the cylinders 11a of the first bank 11. At this time, the fuel injection count is fixed to the full lift injection count DF and the partial lift injection count DP calculated in step S123, and the division ratio is fixed to the division ratio calculated in step S125. Additionally, the lift injection mode of each fuel injection is fixed to the lift injection mode determined in step S125. Under this condition, the first corrected injection amount Ya is calculated so as to satisfy the target torque required for the internal combustion engine 100. The reason for the recalculation of the first corrected injection amount Ya is that when the full lift injection count DF and the partial lift injection count DP change from the base full lift injection count CF and the base partial lift injection count CP that have been calculated or when the lift injection mode changes, the fuel amount necessary in the cylinders 11a of the first bank 11 during one combustion cycle may change.

Additionally, the injection amount correction portion 82 (controller 80) recalculates the second corrected injection amount Yb based on the running state of the internal combustion engine 100, the fuel injection count DT, the full lift injection count DF, the partial lift injection count DP, and the air-fuel ratio AF2 of exhaust gases discharged from the cylinders 21a of the second bank 21. At this time, the fuel injection count is fixed to the full lift injection count DF and the partial lift injection count DP calculated in step S123, and the division ratio is fixed to the division ratio calculated in step S125. Additionally, the lift injection mode of each fuel injection is fixed to the lift injection mode determined in step S125. Under this condition, the second corrected injection amount Yb is calculated so as to satisfy the target torque required for the internal combustion engine 100. The reason for the recalculation of the second corrected injection amount Yb is that when the full lift injection count DF and the partial lift injection count DP change from the base full lift injection count CF and the base partial lift injection count CP that have been calculated or when the lift injection mode changes, the fuel amount necessary in the cylinders 21a of the second bank 21 during one combustion cycle may change. Thereafter, the controller 80 allows the process to proceed to step S31.

Next, the operation of the present embodiment will be described.

As shown in (a) in FIG. 7, it is assumed that the injection amount calculation portion 81 (controller 80) has calculated a base injection amount E. Additionally, it is assumed that the injection count determination portion 83 (controller 80) has determined that the base injection count CT is three and that the base full lift injection count CF is three (the base partial lift injection count CP is zero) with respect to this base injection amount E.

For example, if there is an individual difference between the first direct injection valve 16 and the second direct injection valve 26 or if there is a difference in fuel injection properties between the two valves 16 and 26 because of, for example, deterioration due to age, a difference may occur between the actual amount of fuel injected from the first direct injection valve 16 and the actual amount of fuel injected from the second direct injection valve 26. As a result, a difference also occurs between the air-fuel ratio AF1 detected from the first air-fuel ratio sensor 51 corresponding to the first bank 11 and the air-fuel ratio AF2 detected from the second air-fuel ratio sensor 52 corresponding to the second bank 21. Accordingly, a difference occurs between the first corrected injection amount Ya calculated based on the air-fuel ratio AF1 of exhaust gases discharged from the cylinders 11a of the first bank 11 and the second corrected injection amount Yb calculated based on the air-fuel ratio AF2 of exhaust gases discharged from the cylinders 21a of the second bank 21 as shown in (b) in FIG. 7. The corrected amounts with respect to the base injection amount E are exaggerated in (b) in FIG. 7.

As shown in (c) in FIG. 7, the injection count determination portion 83 (controller 80) determines whether the first corrected injection amount Ya can be injected through the base injection count CT, which is three. The three injections of the base injection count CT all have been determined as a full lift injection, and therefore the injection count determination portion 83 compares the first corrected injection amount Ya with the total of the minimum full-lift injection amount QFmin that will be injected through three injections. In this case, the first corrected injection amount Ya is greater than or equal to the total of the minimum full-lift injection amount QFmin injected through three injections. Thus, the injection count determination portion 83 temporarily determines that the fuel injection count corresponding to the first corrected injection amount Ya is three. In other words, the fuel injection count that has been temporarily determined with respect to the first corrected injection amount Ya is equal to the base injection count CT, which is three.

Additionally, the injection count determination portion 83 (controller 80) determines whether the second corrected injection amount Yb can be injected through the base injection count CT, which is three. The three injections of the base injection count CT all have been determined as a full lift injection, and therefore the injection count determination portion 83 compares the second corrected injection amount Yb with the total of the minimum full-lift injection amount QFmin that will be injected through three injections. In this case, the second corrected injection amount Yb is less than the total of the minimum full-lift injection amount QFmin injected through three injections. Thus, the injection count determination portion 83 temporarily determines that the fuel injection count corresponding to the second corrected injection amount Yb is two and is smaller by one than the base injection count CT, which is three.

The fuel injection count with respect to the first corrected injection amount Ya, which is temporarily determined to be three, differs from the fuel injection count with respect to the second corrected injection amount Yb, which is temporarily determined to be two. For example, if fuel injection is actually performed based on the fuel injection count with respect to the first corrected injection amount Ya, which is temporarily determined to be three, and the fuel injection count with respect to the second corrected injection amount Yb, which is temporarily determined to be two, the combustion state of the cylinders 11a of the first bank 11 and the combustion state of the cylinders 21a of the second bank 21 would be unbalanced, causing, for example, vibration and noise.

In this regard, in the present embodiment, if the fuel injection count with respect to the first corrected injection amount Ya, which is temporarily determined to be three, differs from the fuel injection count with respect to the second corrected injection amount Yb, which is temporarily determined to be two, as shown in (d) in FIG. 7, the fuel injection count is decreased by one from three, which is the base full lift injection count CF, so that the full lift injection count DF is two as shown in (d) in FIG. 7. Additionally, the injection count determination portion 83 increases the fuel injection count by one from zero, which is the base partial lift injection count CP, so that the partial lift injection count DP is determined to be one. Thereafter, the injection count determination portion 83 determines that the fuel injection count DT is the base injection count CT, or three. Consequently, the first fuel injection count to inject the first corrected injection amount Ya is equal to the second fuel injection count to inject the second corrected injection amount Yb.

As described, in the present embodiment, even when a difference occurs between the first corrected injection amount Ya of the first bank 11 and the second corrected injection amount Yb of the second bank 21, the first fuel injection count of the first bank 11 is set to be equal to the second fuel injection count of the second bank 21. This prevents the combustion state of the cylinders 11a of the first bank 11 and the combustion state of the cylinders 21a of the second bank 21 from becoming unbalanced, which would occur when the first fuel injection count differs from the second fuel injection count. This, then, limits vibration and noise that occur when the combustion state of the first bank 11 and the combustion state of the second bank 21 are unbalanced.

Additionally, in the present embodiment, when setting the first fuel injection count through which the first corrected injection amount Ya of fuel is injected to be equal to the second fuel injection count through which the second corrected injection amount Yb of fuel is injected, any of the fuel injection count temporarily determined with respect to the first corrected injection amount Ya and the fuel injection count temporarily determined with respect to the second corrected injection amount Yb will not be decreased. This allows for formation of fuel layers having different fuel concentrations even when the fuel injection count is decreased. In other words, fuel layers having different fuel concentrations may be formed in the cylinders 11a of the first bank 11 and in the cylinders 21a of the second bank 21.

As shown in (e) in FIG. 7, it is assumed that the injection count determination portion 83 (controller 80) has calculated that a division ratio that is a ratio at which the first corrected injection amount Ya is divided for each injection is "7:2:1" in order from the earliest timing of injection. Additionally, it is assumed that the injection count determination portion 83 (controller 80) has determined the lift injection mode in each fuel injection corresponding to the first corrected injection amount Ya among three injections in the fuel injection count DT so that the first two injections are performed as a full lift injection and that the last injection is performed as a partial lift injection.

It is assumed that the injection count determination portion 83 (controller 80) has calculated that a division ratio that is a ratio at which the second corrected injection amount Yb is divided for each injection is "7:2:1" in order from the earliest timing of injection. Additionally, the injection count determination portion 83 (controller 80) sets the lift injection mode of each fuel injection corresponding to the second corrected injection amount Yb to be the same as the lift injection mode of each fuel injection in the first fuel injection count. In particular, when it is determined that the first fuel injection count is N and that the second fuel injection count is N, where "N" is an integer greater than or equal to two, the first direct injection valve 16 and the second direct injection valve 26 each perform the N-th fuel injection, or the last injection, in the same lift injection mode.

Even when the first fuel injection count of the first bank 11 and the second fuel injection count of the second bank 21 are each set to N and are equal to each other, where "N" is an integer greater than or equal to two, the combustion state of the cylinders 11a of the first bank 11 and the combustion state of the cylinders 21a of the second bank 21 may be unbalanced. In detail, if the atomization state of fuel excessively differs between the first bank 11 and the second bank 21 in the N-th fuel injection, in which the time from fuel injection to combustion is comparatively short and the combustion state is easily affected, the combustion state of the cylinders 11a of the first bank 11 and the combustion state of the cylinders 21a of the second bank 21 may be unbalanced. In particular, if the lift injection mode of N-th fuel injection is determined so that the fuel injection of one of the first bank 11 and the second bank 21 is a full lift injection and that the fuel injection of the other one of the first bank 11 and the second bank 21 is a partial lift injection, the difference in the atomization state of fuel in the N-th fuel injection between of the first bank 11 and the second bank 21 tends to be large.

In this regard, in the present embodiment, in the N-th fuel injection, in which the time from fuel injection to combustion is comparatively short and the combustion state is easily affected, the difference between the atomization state of fuel in the fuel injection of the first bank 11 and the atomization state of fuel in the fuel injection of the second bank 21 is expected to be smaller than a case in which the lift injection mode of the first bank 11 differs from the lift injection mode of the second bank 21. This further effectively prevents the combustion state of the cylinder 11a of the first bank 11 and the combustion state of the cylinders 21a of the second bank 21 from becoming unbalanced.

As shown in (e) in FIG. 7, the injection amount correction portion 82 (controller 80) recalculates the first corrected injection amount Ya based on the air-fuel ratio AF1 and the second corrected injection amount Yb based on the air-fuel ratio AF2. In (e) in FIG. 7, the first corrected injection amount Ya that was precedingly calculated and the first corrected injection amount Ya that is recalculated are the same size. Additionally, in (e) in FIG. 7, the second corrected injection amount Yb that was precedingly calculated and the second corrected injection amount Yb that is recalculated are the same size.

The injection count determination portion 83 (controller 80) determines whether the smallest required full-lift injection amount of full lift injection in the first bank 11 is greater than or equal to the minimum full-lift injection amount QFmin. In detail, the injection count determination portion 83 (controller 80) determines whether the smallest one of the injection amounts in the full lift injections at the division ratio of the first corrected injection amount Ya calculated to be "7:2:1," or the first corrected injection amount Ya×0.2, is greater than or equal to the minimum full-lift injection amount QFmin. Additionally, the injection count determination portion 83 (controller 80) determines whether the smallest one of the injection amounts in the partial lift injections at the division ratio of the first corrected injection amount Ya calculated to be "7:2:1," or the first corrected injection amount Ya×0.1, is greater than or equal to the minimum partial-lift injection amount QPmin. In this case, the first corrected injection amount Ya×0.2 is greater than or equal to the minimum full-lift injection amount QFmin, and the first corrected injection amount Ya×0.1 is greater than or equal to the minimum partial-lift injection amount QPmin. Thus, as shown in (f) in FIG. 7, the division ratio of the first corrected injection amount Ya is determined to be "7:2:1."

As shown in (e) in FIG. 7, the injection count determination portion 83 (controller 80) determines whether the smallest required full-lift injection amount of full lift injection in the second bank 21 is greater than or equal to the minimum full-lift injection amount QFmin. In detail, the injection count determination portion 83 (controller 80) determines whether the smallest one of the injection amounts in the full lift injections at which the division ratio of the second corrected injection amount Yb calculated to be "7:2:1," or the second corrected injection amount Yb×0.2, is greater than or equal to the minimum full-lift injection amount QFmin.

In this case, the second corrected injection amount Yb×0.2 is less than the minimum full-lift injection amount QFmin. Thus, the injection count determination portion 83 calculates that the division ratio of the second corrected injection amount Yb is maximally close to the precedingly calculated division ratio. In detail, as shown in (f) in FIG. 7, the division ratio is calculated so that the smallest required full-lift injection amount of full lift injection in the second bank 21 is equal to the minimum full-lift injection amount QFmin. The division ratio of the second corrected injection amount Yb is "5:4:1." In this case, the smallest one of the injection amounts in the partial lift injections at which the division ratio of the second corrected injection amount Yb calculated to be "7:2:1," or the second corrected injection amount Yb×0.1, is greater than or equal to the minimum partial-lift injection amount QPmin. Thus, the division ratio of that partial lift injection is maintained.

The present embodiment has advantage (4) described below in addition to advantages (1) and (2) described above.

(4) In the present embodiment, when setting the first fuel injection count through which the first corrected injection amount Ya of fuel is injected to be equal to the second fuel injection count through which the second corrected injection amount Yb of fuel is injected, any of the fuel injection count corresponding to the first corrected injection amount Ya and the fuel injection count corresponding to the second corrected injection amount Yb will not be decreased. This allows for formation of multiple fuel layers having different fuel concentrations in the cylinders 11a of the first bank 11 and in the cylinders 21a of the second bank 21.

The above embodiments can be modified as follows.

The technique relative to the determination of the fuel injection count in the first and second embodiments is applicable also to internal combustion engines other than the V-type eight-cylinder internal combustion engine 100. For example, the controller 80 is applicable also to an in-line four-cylinder internal combustion engine. If the first corrected injection amount Ya is calculated based on the state of exhaust gases discharged from two of the in-line four cylinders, these two cylinders are configured to be a first cylinder group. If the second corrected injection amount Yb is calculated based on the state of exhaust gases discharged from the remaining two cylinders of the in-line four cylinders, these two cylinders are configured to be a second cylinder group.

In the first and second embodiments, the internal combustion engine 100 may include first port injection valves that serve as first fuel injection valves injecting fuel into the first air intake pipe 42 in addition to the first direct injection valves 16. More specifically, in total, the four first direct injection valves 16 and four first port injection valves supply fuel to the four cylinders 11a of the first bank 11. Additionally, the internal combustion engine 100 may include second port injection valves that serve as second fuel injection valves injecting fuel into the second air intake pipe 43 in addition to the second direct injection valves 26. More specifically, in total, the four second direct injection valves 26 and four second port injection valves supply fuel to the four cylinders 21a of the second bank 21. In this case, it is only necessary for the first direct injection valve 16 and the first port injection valve to perform divided injection in which the amount of fuel required during one combustion cycle is supplied to each cylinder through multiple injections. Additionally, it is only necessary for the second direct injection valve 26 and the second port injection valve to perform divided injection in which the amount of fuel required during one combustion cycle is supplied to each cylinder through multiple injections. For example, when the first direct injection valves 16 perform two fuel injections and the first port injection valves perform one fuel injection during one combustion cycle to supply fuel to the cylinders 11a of the first bank 11, the first fuel injection count is three in total.

In the first and second embodiments, when the internal combustion engine 100 includes the first port injection valves serving as the first fuel injection valves, the first direct injection valves 16 may be omitted from the internal combustion engine 100. Additionally, when the internal combustion engine 100 includes the second port injection valves serving as the second fuel injection valves, the second direct injection valve 26 may be omitted from the internal combustion engine 100. In this case, it is only necessary for the first port injection valves to perform divided injection in which the amount of fuel required during one combustion cycle is supplied to each cylinder through multiple injections. Additionally, it is only necessary for the second port injection valves to perform divided injection in which the amount of fuel required during one combustion cycle is supplied to each cylinder through multiple injections.

In the first and second embodiments, the injection amount correction portion 82 may calculate the first corrected injection amount Ya and the second corrected injection amount Yb based on the state of intake air of the first bank 11 and of the second bank 21. For example, when a fuel vapor flows from a fuel tank storing the fuel into the first air intake pipe 42 and the second air intake pipe 43, the amount of the fuel vapor flowing into the first bank 11 may differ from the amount of the fuel vapor flowing into the second bank 21. In this case, a difference in the amount of fuel required during one combustion cycle may occur between the cylinders 11a of the first bank 11 and the cylinders 21a of the second bank 21. Therefore, when the fuel vapor flows into the first air intake pipe 42 and the second air intake pipe 43, the first corrected injection amount Ya and the second corrected injection amount Yb may be calculated based on the state of intake air such as the amount of the fuel vapor. When blow-by gas flows from a crankcase into the first air intake pipe 42 and the second air intake pipe 43, the amount of blow-by gas flowing into the first bank 11 may differ from the amount of blow-by gas flowing into the second bank 21. In this case, a difference in the amount of fuel required during one combustion cycle may occur between the cylinders 11a of the first bank 11 and the cylinders 21a of the second bank 21. Therefore, when blow-by gas flows into the first air intake pipe 42 and the second air intake pipe 43, the first corrected injection amount Ya and the second corrected injection amount Yb may be calculated based on the state of intake air such as the amount of blow-by gas. When the first corrected injection amount Ya and the second corrected injection amount Yb are calculated based on the state of intake air of the first bank 11 and of the second bank 21 as described above, the calculation may, but does not necessarily have to, be performed based on the state of exhaust gases of the first bank 11 and of the second bank 21.

In the first embodiment, the first direct injection valve 16 and the second direct injection valve 26 may be capable of injecting fuel only by full lift injection.

In the first and second embodiments, the lift injection mode of each fuel injection in the first fuel injection count and the lift injection mode of each fuel injection in the second fuel injection count are not necessarily required to be equal to each other. Also, in this case, when it is determined that the first fuel injection count is N and that the second fuel injection count is N, where "N" is an integer greater than or equal to two, the combustion state of the cylinders 11a of the first bank 11 and the combustion state of the cylinders 21a of the second bank 21 are somewhat prevented from becoming unbalanced as long as the first direct injection valve 16 and the second direct injection valve 26 each perform the N-th fuel injection, or the last injection, in the same lift injection mode.

Further, when it is determined that the first fuel injection count is N and that the second fuel injection count is N, where "N" is an integer greater than or equal to two, the first direct injection valve 16 and the second direct injection valve 26 do not necessarily have to perform the N-th fuel injection, or the last injection, in the same lift injection mode. For example, if the combustion state of the cylinders 11a of the first bank 11 and the combustion state of the cylinders 21a of the second bank 21 are sufficiently prevented from becoming unbalanced by equalizing the first fuel injection count of the first bank 11 and the second fuel injection count of the second bank 21, the lift injection modes of the N-th fuel injection do not necessarily have to be the same.

In the first and second embodiments, the maximum number of times of injections in divided injection may be appropriately changed.

Therefore, the present examples and embodiments are to be considered as illustrative and not restrictive and the invention is not to be limited to the details given herein, but may be modified within the scope and equivalence of the appended claims.

The invention claimed is:

1. A controller for an internal combustion engine, wherein the internal combustion engine includes a first cylinder group including two or more cylinders, a first fuel injection valve configured to supply fuel to the cylinders of the first cylinder group, a second cylinder group including two or more cylinders that are different from the cylinders of the first cylinder group, and a second fuel injection valve configured to supply fuel to the cylinders of the second cylinder group, and the internal combustion engine allows divided injection in which an amount of fuel required during one combustion cycle is supplied to each cylinder through multiple injections, the controller comprising:

an injection amount calculation portion configured to calculate a base injection amount, the base injection amount being a base amount of fuel required during one combustion cycle, in accordance with a running state of the internal combustion engine;

an injection amount correction portion configured to correct the base injection amount based on at least one of an intake state and an exhaust state of the first cylinder group to calculate a first corrected injection amount, the first corrected injection amount being an amount of fuel injected from the first fuel injection valve, and configured to correct the base injection amount based on at least one of an intake state and an exhaust state of the second cylinder group to calculate a second corrected injection amount, the second corrected injection amount being an amount of fuel injected from the second fuel injection valve; and an injection count determination portion configured to determine a first fuel injection count, the first fuel injection count being a number of times that fuel is injected from the first fuel injection valve during one combustion cycle, and a second fuel injection count, the second fuel injection count being a number of times that fuel is injected from the second fuel injection valve during one combustion cycle, wherein when the first corrected injection amount and the second corrected injection amount are calculated using the same base injection amount, the injection count determination portion is configured to set the first fuel injection count corresponding to the first corrected injection amount to be equal to the second fuel injection count corresponding to the second corrected injection amount.

2. The controller for an internal combustion engine according to claim 1, wherein each of the first fuel injection valve and the second fuel injection valve has a valve member and is configured to perform fuel injection in an injection mode selected from a full lift injection in which the valve member is fully opened and a partial lift injection in which the valve member is not fully opened, the injection count determination portion is further configured to determine the injection mode with respect to each fuel injection in the divided injection, and if the injection count determination portion determines that the first fuel injection count is N and that the second fuel injection count is N, where N is an integer greater than or equal to two, the injection count determination portion is configured so that the first fuel injection valve and the second fuel injection valve perform at least N-th fuel injection in the same injection mode.

3. The controller for an internal combustion engine according to claim 1, wherein
the injection count determination portion is configured to respectively determine a first temporary fuel injection count and a second temporary fuel injection count with respect to the first corrected injection amount and the second corrected injection amount that are calculated using the same base injection amount, and
if the first temporary fuel injection count differs from the second temporary fuel injection count, the injection count determination portion is configured to decrease a larger one of the first temporary fuel injection count and the second temporary fuel injection count so as to conform to a smaller one of the first temporary fuel injection count and the second temporary fuel injection count so that the first fuel injection count is equal to the second fuel injection count.

4. The controller for an internal combustion engine according to claim 1, wherein
the injection count determination portion is configured to respectively determine a first temporary fuel injection count and a second temporary fuel injection count with respect to the first corrected injection amount and the second corrected injection amount that are calculated using the same base injection amount, and
if the first temporary fuel injection count differs from the second temporary fuel injection count, the injection count determination portion is configured to increase a smaller one of the first temporary fuel injection count and the second temporary fuel injection count so as to conform to a larger one of the first temporary fuel injection count and the second temporary fuel injection count so that the first fuel injection count is equal to the second fuel injection count.

5. The controller for an internal combustion engine according to claim 1, wherein each of the first fuel injection valve and the second fuel injection valve has a valve member and is configured to perform fuel injection in an injection mode selected from a full lift injection in which the valve member is fully opened and a partial lift injection in which the valve member is not fully opened,
the injection count determination portion is further configured to determine the injection mode with respect to each fuel injection in the divided injection,
the injection count determination portion is configured to respectively determine a first temporary fuel injection count and a second temporary fuel injection count with respect to the first corrected injection amount and the second corrected injection amount that are calculated using the same base injection amount, and
if the first temporary fuel injection count differs from the second temporary fuel injection count, the injection count determination portion is configured to increase a number of partial lift injections corresponding to a smaller one of the first temporary fuel injection count and the second temporary fuel injection count so as to allow the smaller one to conform to a larger one of the first temporary fuel injection count and the second temporary fuel injection count so that the first fuel injection count is equal to the second fuel injection count.

6. A method for controlling an internal combustion engine, wherein the internal combustion engine includes a first cylinder group including two or more cylinders, a first fuel injection valve configured to supply fuel to the cylinders of the first cylinder group, a second cylinder group including two or more cylinders that are different from the cylinders of the first cylinder group, and a second fuel injection valve configured to supply fuel to the cylinders of the second cylinder group, and the internal combustion engine allows divided injection in which an amount of fuel required during one combustion cycle is supplied to each cylinder through multiple injections, the method comprising:
calculating a base injection amount, the base injection amount being a base amount of fuel required during one combustion cycle, in accordance with a running state of the internal combustion engine;
correcting the base injection amount based on at least one of an intake state and an exhaust state of the first cylinder group to calculate a first corrected injection amount, the first corrected injection amount being an amount of fuel injected from the first fuel injection valve, and correcting the base injection amount based on at least one of an intake state and an exhaust state of the second cylinder group to calculate a second corrected injection amount, the second corrected injection amount being an amount of fuel injected from the second fuel injection valve; and
determining a first fuel injection count, the first fuel injection count being a number of times that fuel is injected from the first fuel injection valve during one combustion cycle, and a second fuel injection count, the second fuel injection count being a number of times that fuel is injected from the second fuel injection valve during one combustion cycle,
wherein when the first corrected injection amount and the second corrected injection amount are calculated using the same base injection amount, the first fuel injection count corresponding to the first corrected injection amount is set to be equal to the second fuel injection count corresponding to the second corrected injection amount.

7. A controller for controlling an internal combustion engine, wherein the internal combustion engine includes a first cylinder group including two or more cylinders, a first fuel injection valve configured to supply fuel to the cylinders of the first cylinder group, a second cylinder group including two or more cylinders that are different from the cylinders of the first cylinder group, and a second fuel injection valve configured to supply fuel to the cylinders of the second cylinder group, and the internal combustion engine allows divided injection in which an amount of fuel required during one combustion cycle is supplied to each cylinder through multiple injections, the controller comprising circuitry, wherein the circuitry is configured to execute:
calculating a base injection amount, the base injection amount being a base amount of fuel required during one combustion cycle, in accordance with a running state of the internal combustion engine;
correcting the base injection amount based on at least one of an intake state and an exhaust state of the first cylinder group to calculate a first corrected injection amount, the first corrected injection amount being an amount of fuel injected from the first fuel injection valve, and correcting the base injection amount based on at least one of an intake state and an exhaust state of the second cylinder group to calculate a second corrected injection amount, the second corrected injection amount being an amount of fuel injected from the second fuel injection valve; and determining a first fuel injection count, the first fuel injection count being a number of times that fuel is injected from the first fuel injection valve during one combustion cycle, and a second fuel injection count, the second fuel injection count being a number of times that fuel is injected from the second fuel injection valve during one combustion cycle, wherein when the first corrected injection amount and the second corrected injection amount are calculated using the same base injection amount, the first fuel injection count corresponding to the first corrected injection amount is set to be equal to the second fuel injection count corresponding to the second corrected injection amount.

* * * * *